(12) United States Patent
Stevens

(10) Patent No.: US 8,904,831 B2
(45) Date of Patent: Dec. 9, 2014

(54) LOCKING ARRANGEMENTS

(71) Applicant: Master Lock Company LLC, Oak Creek, WI (US)

(72) Inventor: Scott B. Stevens, St. Francis, WI (US)

(73) Assignee: Master Lock Company LLC, Oak Creek, WI (US)

( * ) Notice: Subject to any disclaimer, the term of this patent is extended or adjusted under 35 U.S.C. 154(b) by 0 days.

(21) Appl. No.: 13/832,686

(22) Filed: Mar. 15, 2013

(65) Prior Publication Data

US 2014/0060126 A1 Mar. 6, 2014

Related U.S. Application Data

(60) Provisional application No. 61/693,832, filed on Aug. 28, 2012.

(51) Int. Cl.
*E05B 67/06* (2006.01)
*E05B 73/00* (2006.01)

(52) U.S. Cl.
CPC ...................................... *E05B 73/00* (2013.01)
USPC ............... 70/14; 70/18; 70/49; 70/53; 70/360

(58) Field of Classification Search
CPC ... E05B 73/0005; E05B 73/00; E05B 67/003; E05B 73/0011; E05B 67/006; E05B 67/383; E05B 73/0082; E05B 67/06; E05B 67/063; E05B 67/08; E05B 67/10; E05B 67/14; E05B 67/18; E05B 67/28; E05B 71/00; E05B 67/36; E05B 67/32; E05B 2067/006
USPC ............. 70/14, 18, 30, 49, 58, 53, 23, 35–37, 70/38 B, 43, 46, 360, 361
See application file for complete search history.

(56) References Cited

U.S. PATENT DOCUMENTS

| | | | | | |
|---|---|---|---|---|---|
| 288,559 | A | * | 11/1883 | Ekl et al. | 70/27 |
| 451,356 | A | * | 4/1891 | Ayres | 70/28 |
| 507,948 | A | * | 10/1893 | Waine | 70/49 |
| 574,961 | A | * | 1/1897 | Troast | 70/43 |
| 1,342,728 | A | * | 6/1920 | Welch | 70/252 |
| 3,071,958 | A | * | 1/1963 | Russo | 70/93 |

(Continued)

OTHER PUBLICATIONS

International Search Report and Written Opinion dated Jan. 14, 2014, for corresponding International Patent Application Serial No. PCT/US13/56778.

*Primary Examiner* — Lloyd Gall
(74) *Attorney, Agent, or Firm* — Calfee, Halter & Griswold LLP

(57) ABSTRACT

A lock assembly includes a plurality of link members and a lock body. Each link member includes a first end having a first pivot feature defining a first pivot axis and a second end having a second pivot feature defining a second pivot axis disposed at an angle with respect to the first pivot axis. The plurality of link members includes a first end link member, a second end link member, and a plurality of intermediate link members pivotably connected to adjacent ones of the plurality of link members at the first and second pivot features. The lock body is pivotably connected to the first pivot feature of the first end link member and includes a locking mechanism and a locking member configured to lockingly engage the second pivot feature of the second end link member when the locking mechanism is moved to a locked condition.

16 Claims, 26 Drawing Sheets

(56) References Cited

U.S. PATENT DOCUMENTS

| | | | | |
|---|---|---|---|---|
| 3,340,709 A | * | 9/1967 | Callahan | 70/209 |
| 3,747,376 A | * | 7/1973 | White, Jr. | 70/18 |
| 3,748,876 A | * | 7/1973 | Mathews | 70/18 |
| 3,811,303 A | * | 5/1974 | Robertson | 70/237 |
| 3,999,409 A | * | 12/1976 | Bell | 70/58 |
| 4,033,160 A | | 7/1977 | Mima | |
| 4,760,718 A | | 8/1988 | Muramatsu et al. | |
| 4,986,095 A | * | 1/1991 | Chou et al. | 70/10 |
| 4,987,753 A | | 1/1991 | Kuo | |
| 5,174,138 A | * | 12/1992 | Shen | 70/209 |
| 5,197,310 A | | 3/1993 | Pedersen | |
| 5,433,092 A | * | 7/1995 | Kuo | 70/46 |
| 5,475,993 A | | 12/1995 | Kuo | |
| 5,487,285 A | * | 1/1996 | Leichel et al. | 70/18 |
| 5,505,064 A | | 4/1996 | Wang | |
| 5,642,635 A | | 7/1997 | Wen-Chyun | |
| 5,732,577 A | | 3/1998 | Okada et al. | |
| 5,913,906 A | * | 6/1999 | Strocchi | 70/18 |
| 6,044,669 A | | 4/2000 | Levi | |
| 6,820,448 B1 | | 11/2004 | Hsieh | |
| 6,904,775 B2 | | 6/2005 | Makos et al. | |
| 7,437,898 B2 | * | 10/2008 | Su | 70/14 |
| 7,481,084 B1 | * | 1/2009 | Wu | 70/18 |
| 7,712,339 B2 | | 5/2010 | Hentschel et al. | |
| 8,302,436 B2 | | 11/2012 | Cheung | |
| 2003/0164009 A1 | | 9/2003 | Levi | |
| 2011/0219829 A1 | | 9/2011 | Trunek | |
| 2012/0042700 A1 | | 2/2012 | Barron et al. | |

* cited by examiner

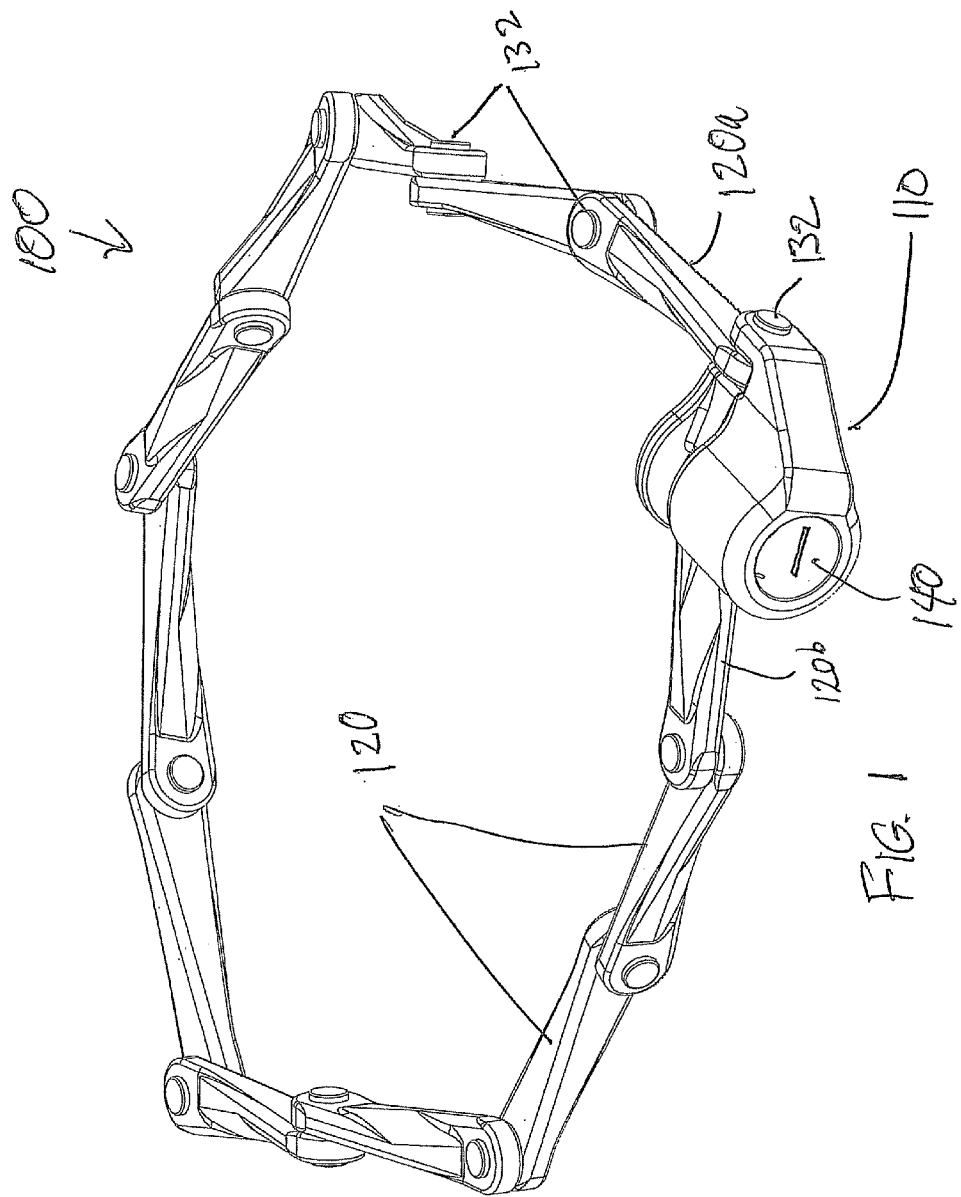

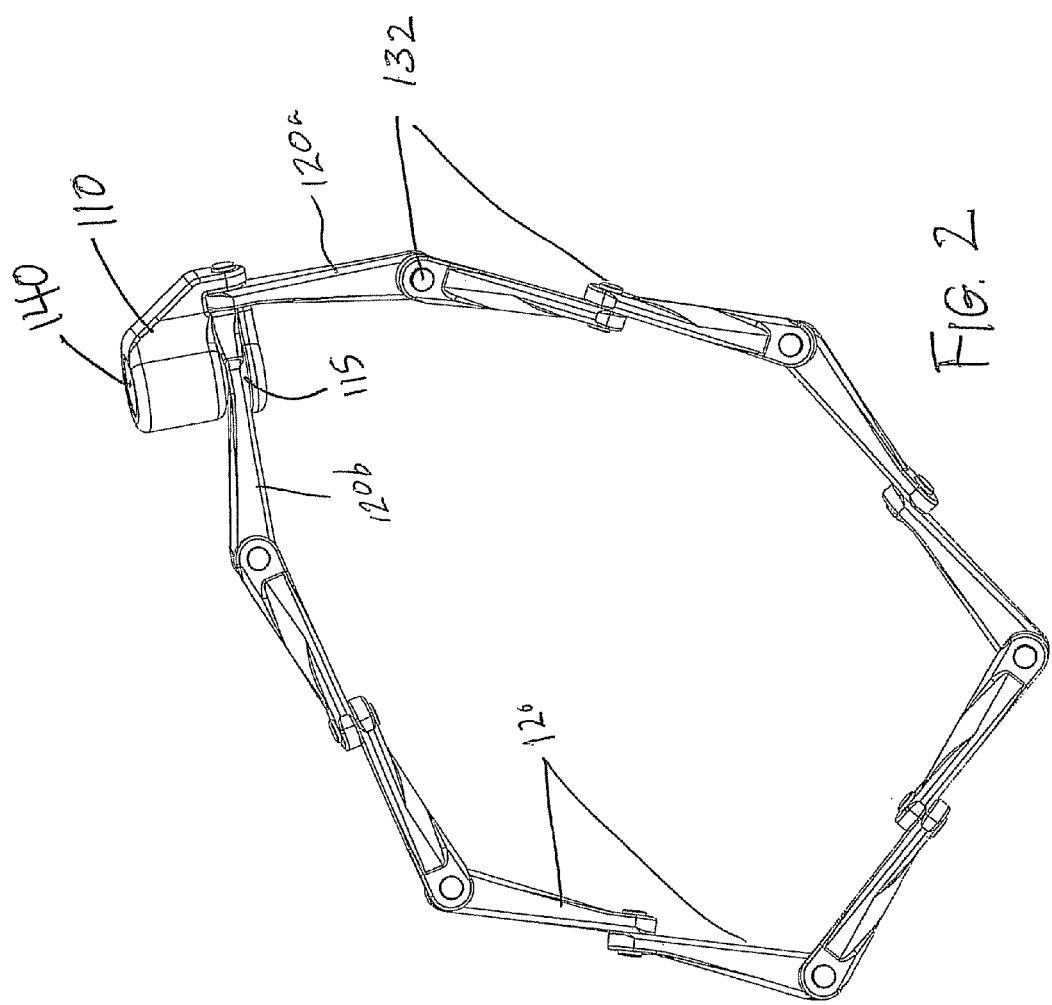

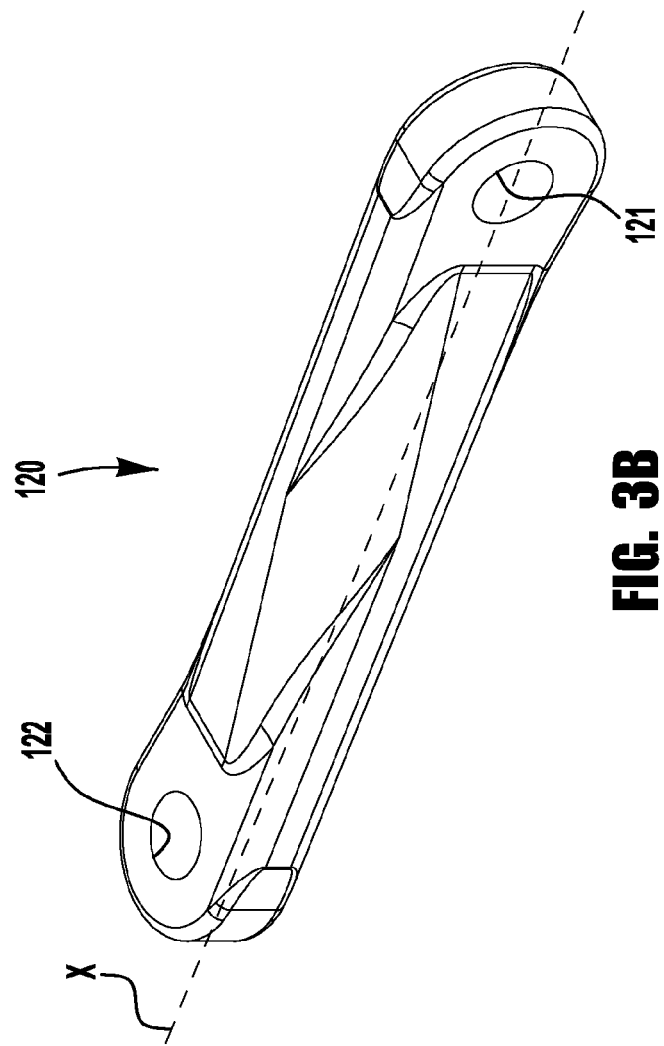
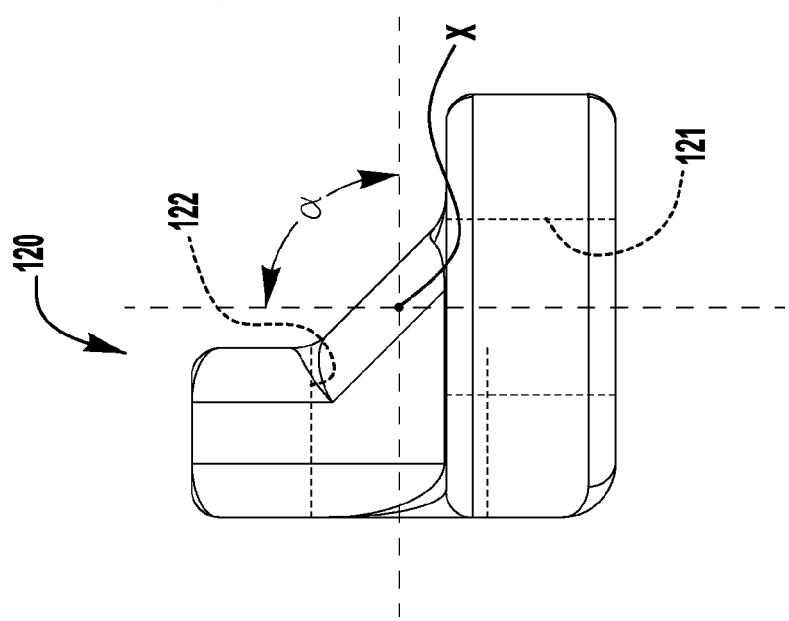

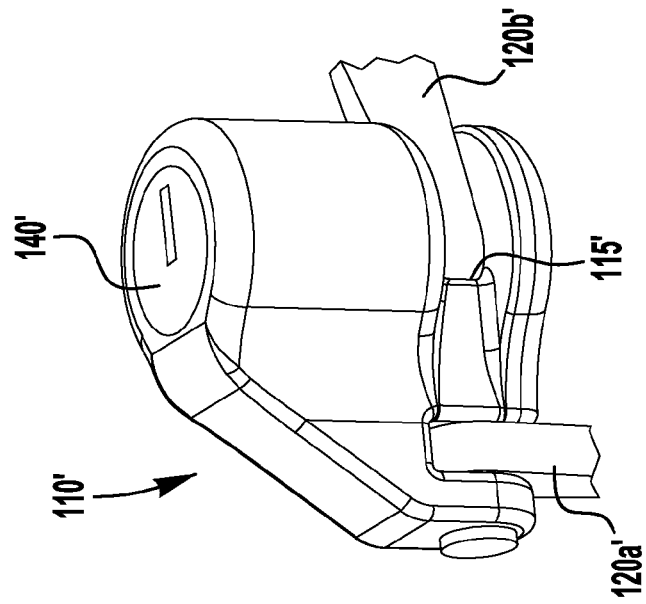
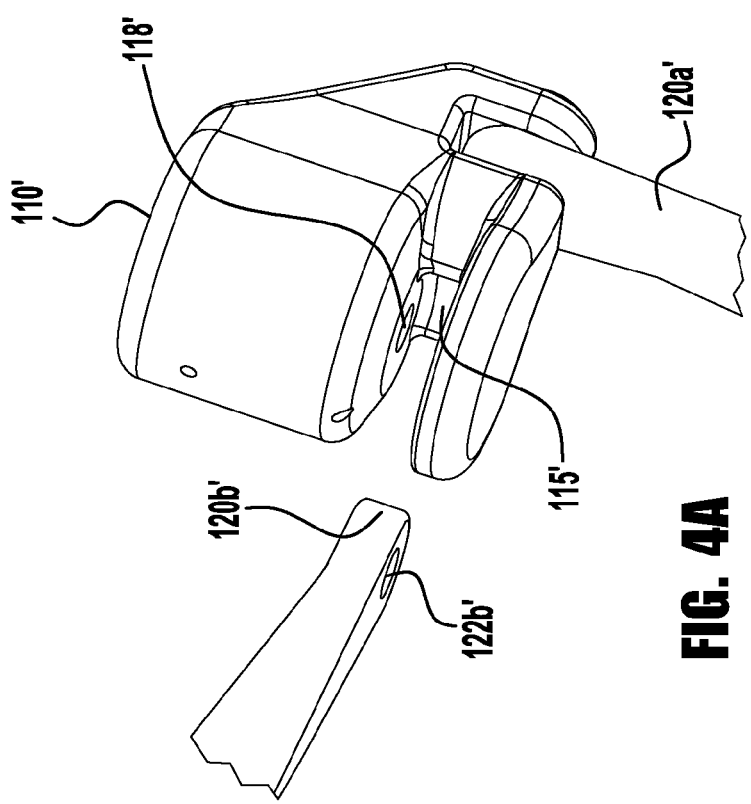

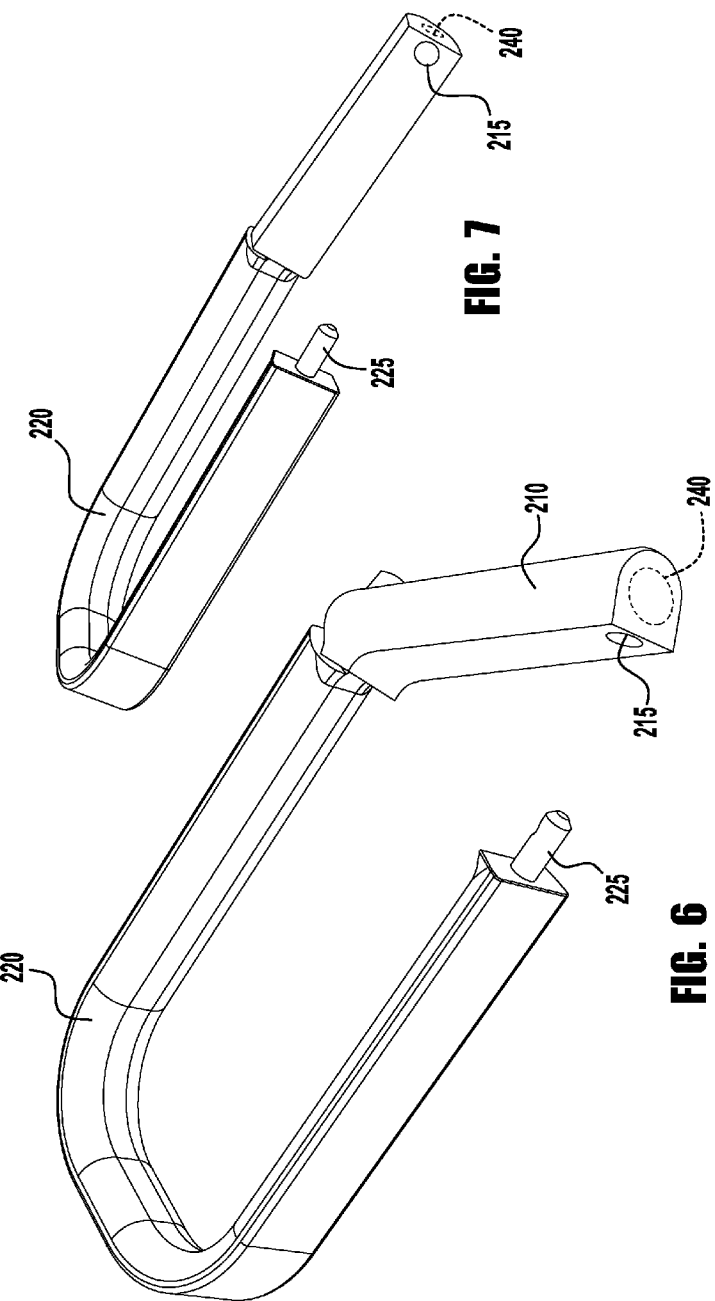

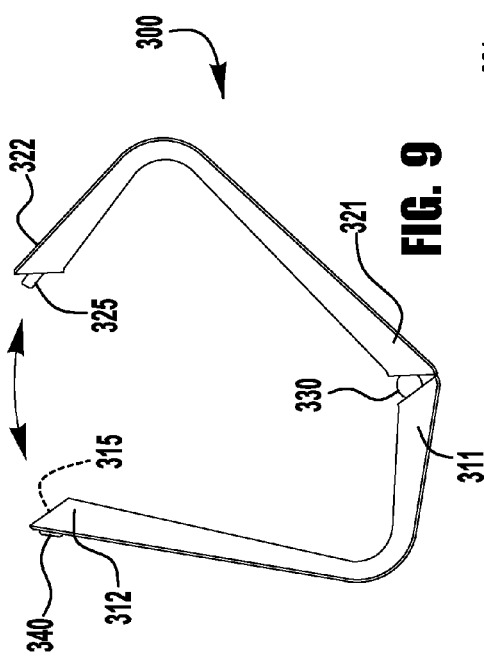
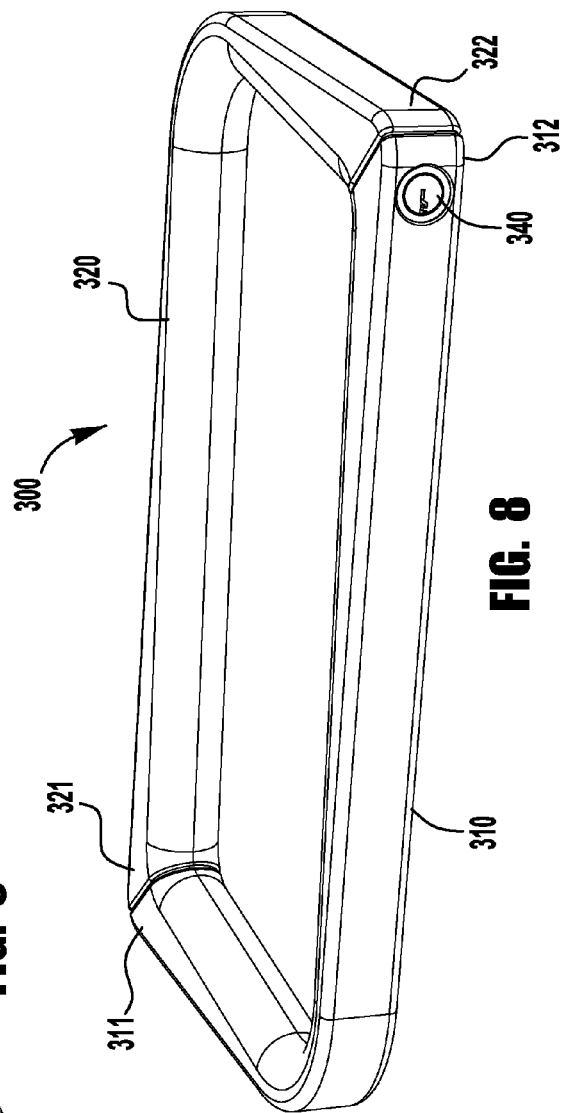

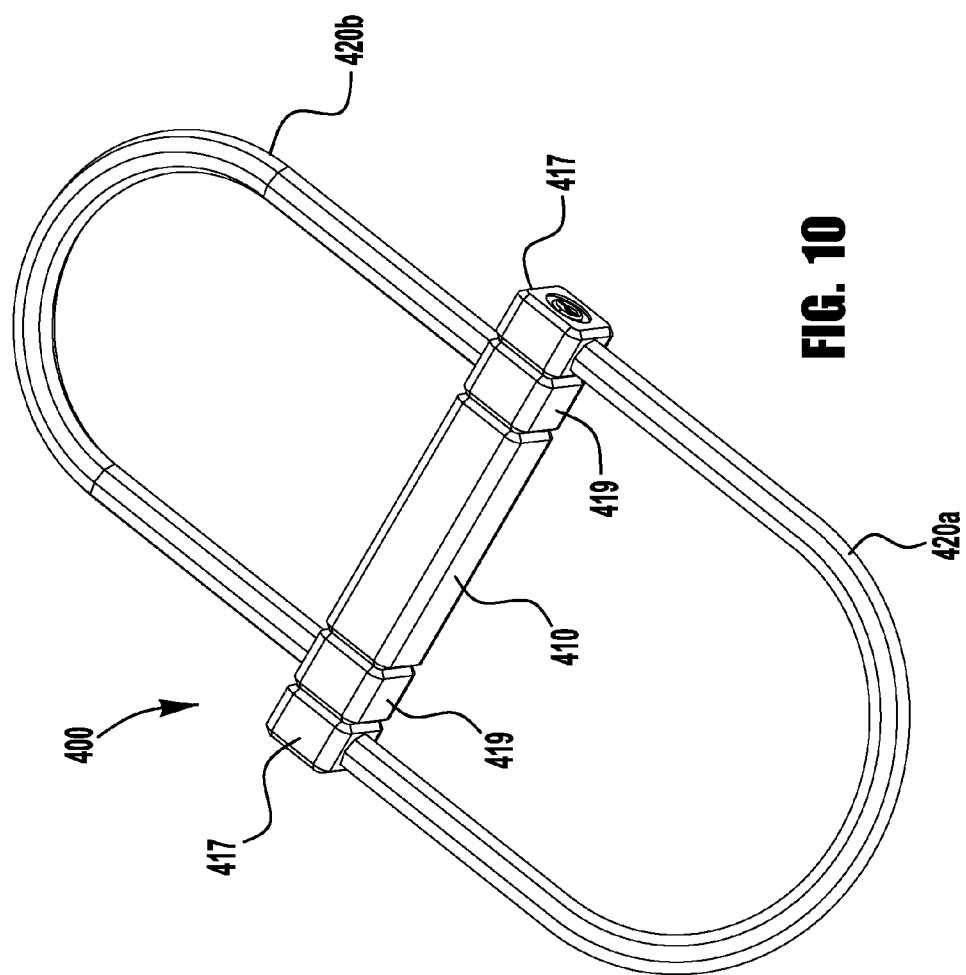

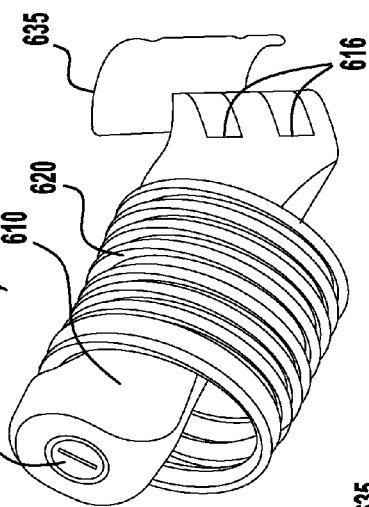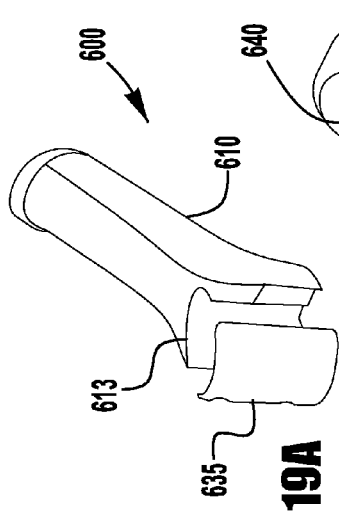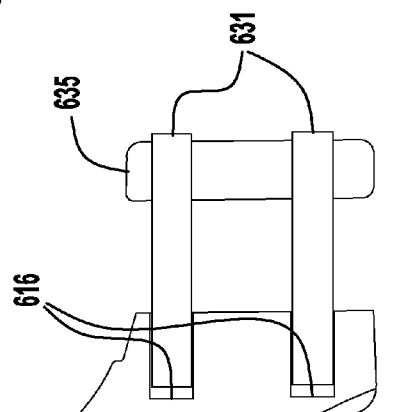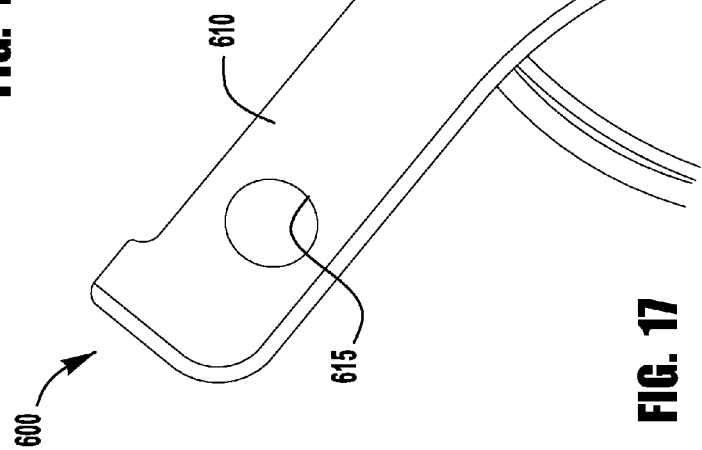

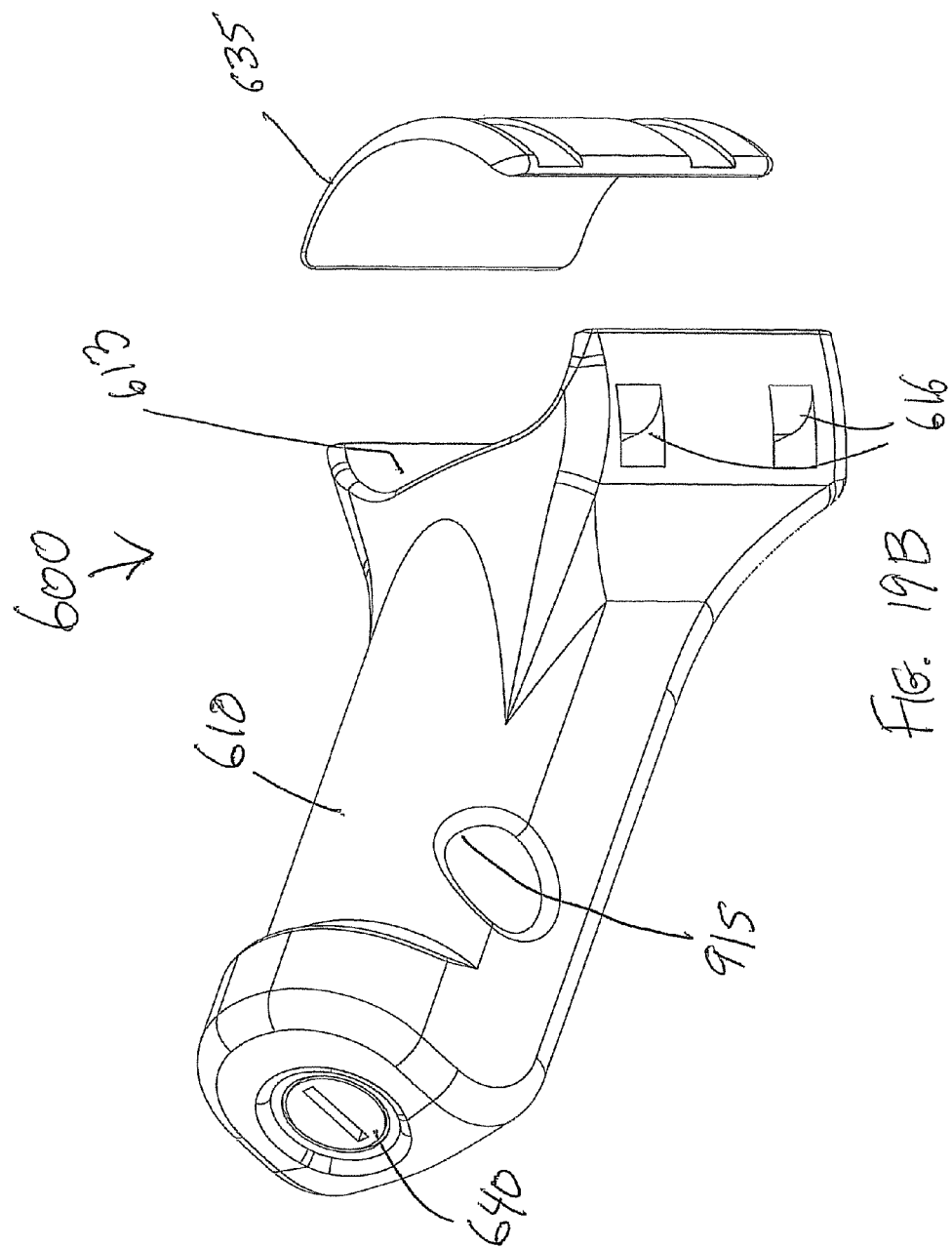

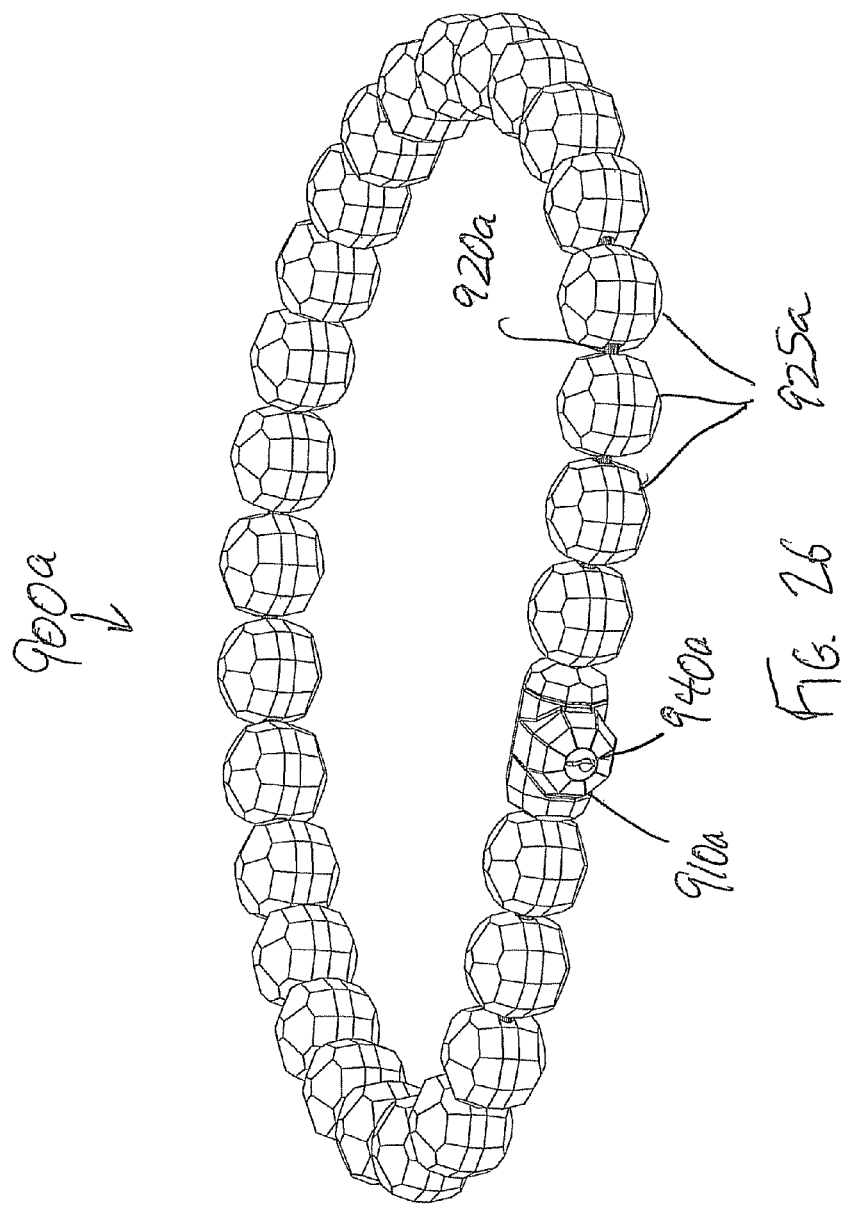

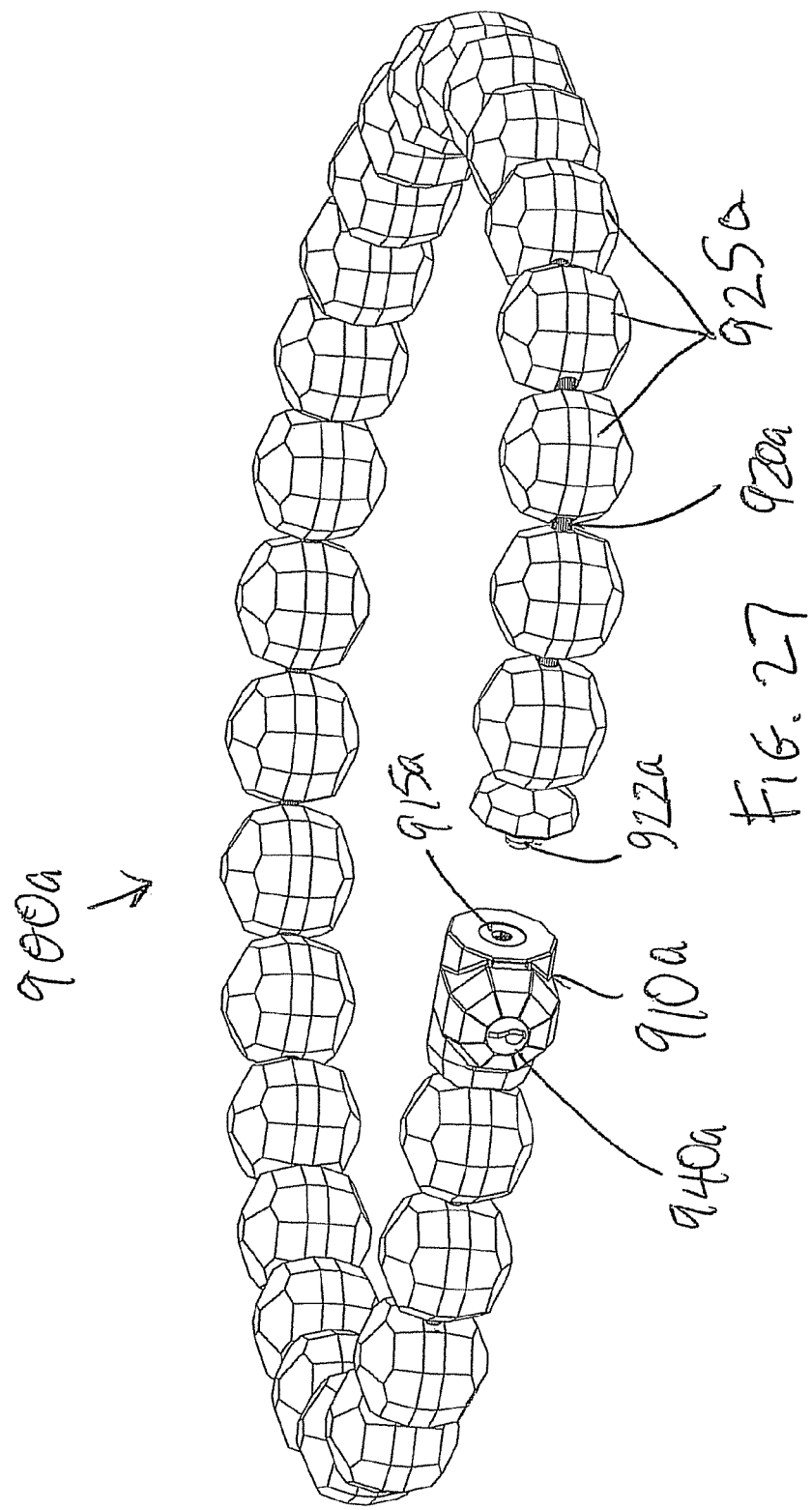

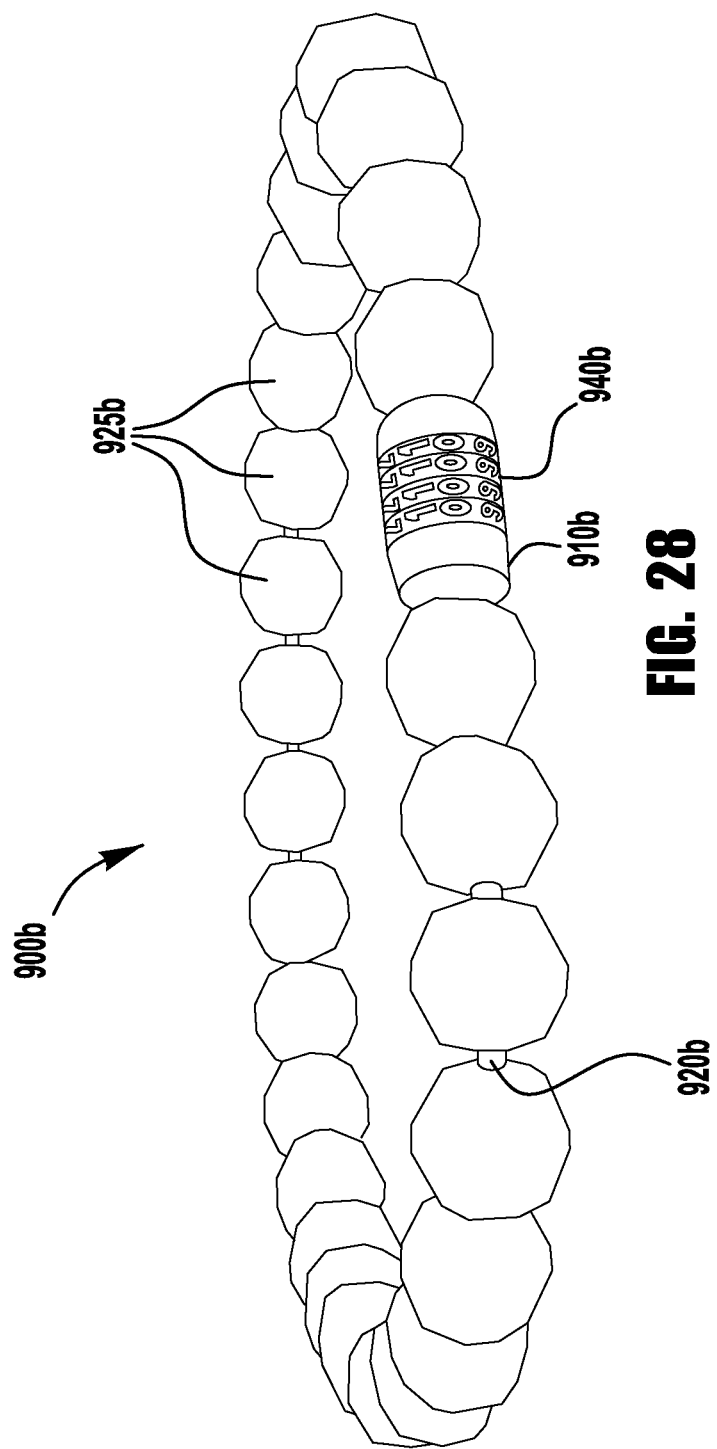

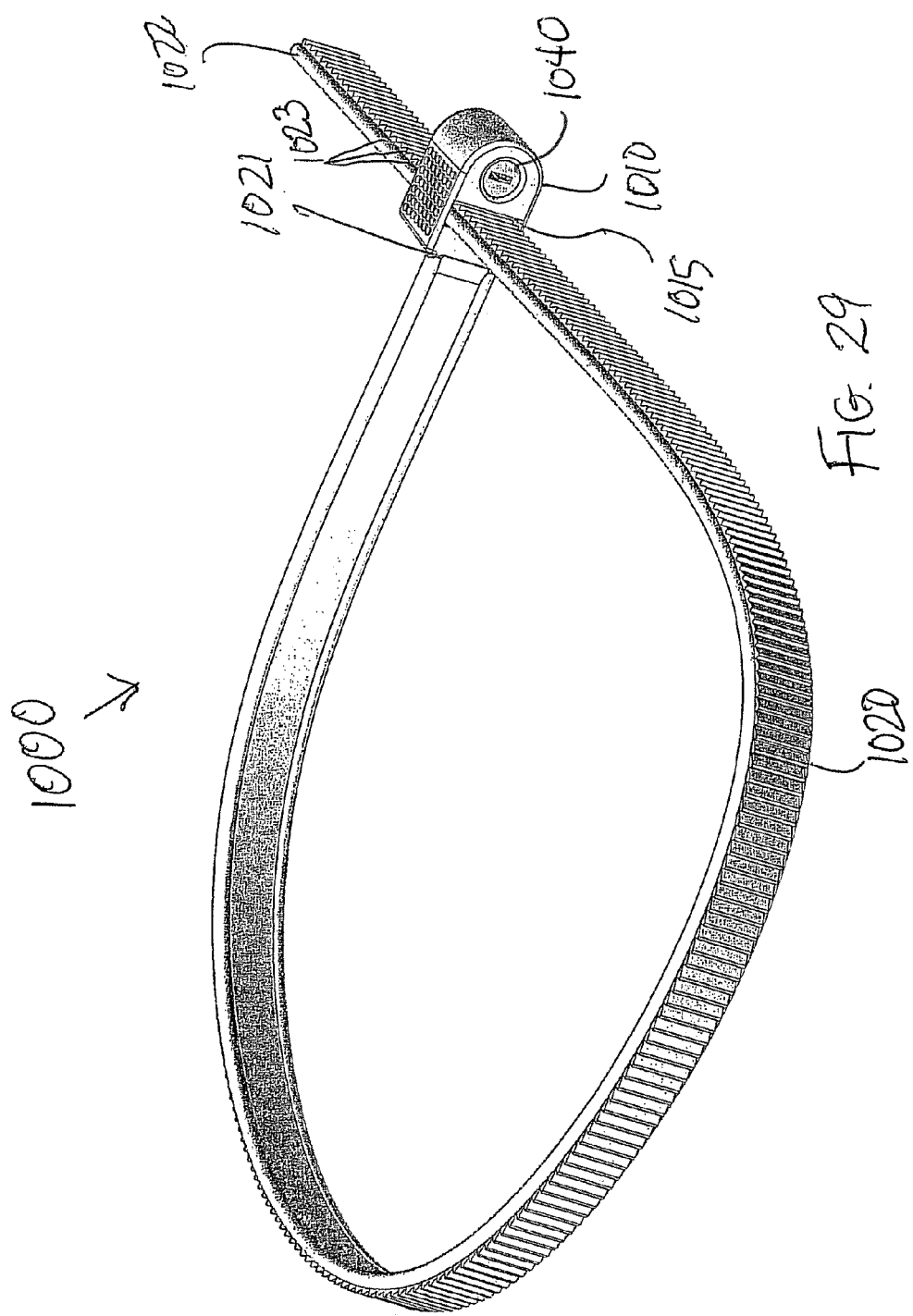

LOCKING ARRANGEMENTS

CROSS-REFERENCE TO RELATED APPLICATION

This application claims priority to and the benefit of U.S. Provisional Patent Application Ser. No. 61/693,832, entitled "LOCKING ARRANGEMENTS" and filed Aug. 28, 2012, the entire disclosure of which is incorporated herein by reference.

BACKGROUND

Various types of padlocks, cable locks, chain locks, and other locking arrangements are often used to lockingly tether or otherwise secure an item, such as a bicycle, motorcycle, scooter, barbecue grill, outdoor furniture, or other publicly accessible items vulnerable to theft.

SUMMARY

According to an exemplary embodiment of the present application, a lock assembly includes a plurality of link members and a lock body. Each link member includes a first end having a first pivot feature defining a first pivot axis and a second end having a second pivot feature defining a second pivot axis disposed at an angle with respect to the first pivot axis. The plurality of link members includes a first end link member, a second end link member, and a plurality of intermediate link members pivotably connected to adjacent ones of the plurality of link members at the first and second pivot features. The lock body is pivotably connected to the first pivot feature of the first end link member and includes a locking mechanism and a locking member configured to lockingly engage the second pivot feature of the second end link member when the locking mechanism is moved to a locked condition.

According to another exemplary embodiment of the present application, a lock assembly includes a plurality of pivotably connected link members and a lock body. The lock body is secured to a first end of a first end link member, and includes a locking mechanism and a locking member. The locking member is configured to lockingly engage a locking feature disposed on a second end of a second end link member when the locking mechanism is moved to a locked condition. Each of the plurality of link members that is connected between the first and second end link members is pivotable about a first pivot axis with respect to an adjacent link member connected to a first end and pivotable about a second pivot axis with respect to another adjacent link member connected to a second end. The longitudinal axis, the first pivot axis, and the second pivot axis are substantially perpendicular to each other.

According to still another exemplary embodiment of the present application, a lock assembly includes a lock body having front and rear walls defining a recess, and a locking post and key cylinder lock assembled with the front wall. The locking post is slideable along a first axis between a locked position extending into the recess toward the rear wall, and an unlocked position withdrawn from the recess and extending outward of the front wall. The key cylinder lock is rotatable about a second axis substantially parallel to the first axis for securing the locking post in the locked position.

According to yet another exemplary embodiment of the present application, a lock assembly includes a lock body and a retainer bar. The lock body includes a first leg portion, a second leg portion extending laterally from the first leg portion, and a locking mechanism disposed at an outer end of the second leg portion. The retainer bar includes a first leg portion hingedly connected to the first leg portion of the lock body, and a second leg portion extending laterally from the first leg portion and including a locking member at an outer end of the second leg portion. The retainer bar is pivotable between a closed position in which the locking member engages the locking mechanism and an open position in which the outer end of the retainer bar second leg portion is spaced apart from the outer end of the lock body second leg portion. The locking mechanism is operable to secure the retainer bar in the closed position.

BRIEF DESCRIPTION OF THE DRAWINGS

Further features and advantages will become apparent from the following detailed description made with reference to the accompanying drawings, wherein:

FIG. 1 is a perspective view of a multiple link lock assembly in accordance with an exemplary embodiment;

FIG. 2 is another perspective view of the multiple link lock assembly of FIG. 1;

FIG. 3A is an end view of a link of the multiple link lock assembly of FIG. 1;

FIG. 3B is a perspective view of a link of the multiple link lock assembly of FIG. 1;

FIG. 4A is a perspective view of another lock body for a multiple link lock assembly, in accordance with an exemplary embodiment, shown with the end link member disengaged from the lock body;

FIG. 4B is a perspective view of the lock body of FIG. 4A, shown with the end link member engaged with the lock body;

FIG. 6 is a perspective view of the hinged U-bar lock assembly of FIG. 5, shown in an unlocked and partially open condition;

FIG. 7 is a perspective view of the hinged U-bar lock assembly of FIG. 5, shown in an unlocked and fully open condition;

FIG. 8 is a perspective view of a hinged L-bar lock assembly in accordance with an exemplary embodiment, shown in a locked condition;

FIG. 9 is a perspective view of the hinged L-bar lock assembly of FIG. 8, shown in an unlocked and open condition;

FIG. 10 is a perspective view of a dual shackle lock assembly in accordance with an exemplary embodiment, shown in a locked condition with the shackles oriented in opposed positions;

FIG. 17 is a partial side view of a mountable cable lock for a bicycle, in accordance with an exemplary embodiment;

FIG. 18 is an upper side perspective view of the cable lock of FIG. 17;

FIG. 19A is a rear perspective view of the cable lock of FIG. 17, shown without the cable locking member;

FIG. 19B is a side perspective view of the cable lock of FIG. 17, shown without the cable locking member;

FIG. 26 is a side perspective view of a beaded cable lock with a key cylinder lock mechanism, in accordance with an exemplary embodiment, shown in a locked condition;

FIG. 27 is a side perspective view of the beaded cable lock of FIG. 26, shown in an unlocked condition;

FIG. 28 is a side perspective view of a beaded cable lock with a combination lock mechanism, in accordance with an exemplary embodiment, shown in a locked condition; and FIG. 29 is a side perspective view of a zip-tie lock, in accordance with an exemplary embodiment.

DETAILED DESCRIPTION

Figure 4:
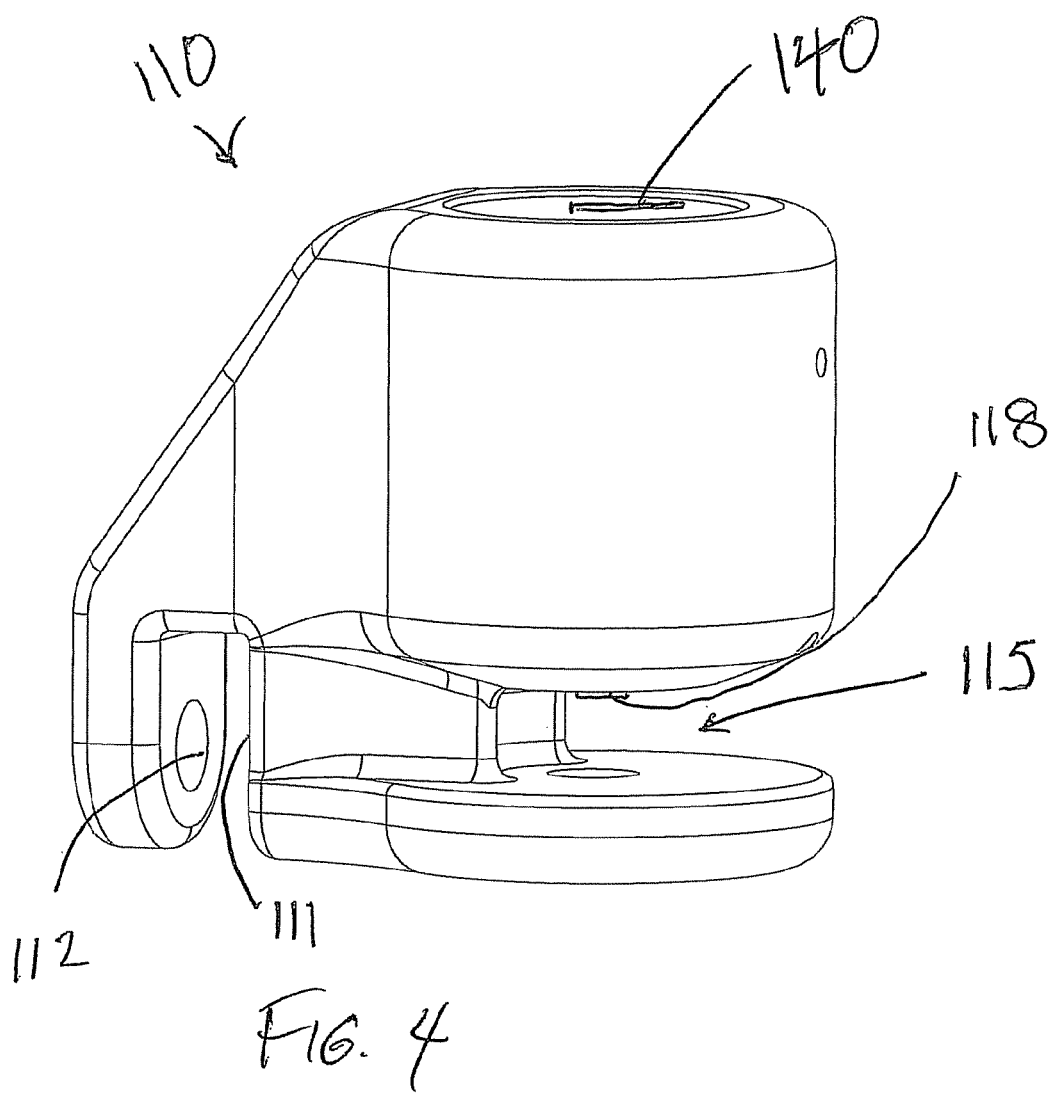
FIG. 4 is a perspective view of the lock body of the multiple link lock assembly of FIG. 1.

This Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while the specific embodiments described herein relate to various locks and locking arrangements for securing bicycles to bike racks or other external structures, and/or immobilizing or disabling bicycles, the exemplary features and embodiments of the present application may additionally or alternatively be applied to other types of locking arrangements, including, for example, various types of padlocks, cable locks, U-bar locks, folding locks, frame locks, locks that permanently attach, releasably attach, and/or remain detached from a bicycle, motorcycle, scooter, or other item to be secured, and other types of uses, for example, with other portable items, such as barbecue grills, outdoor furniture, tools, and electronic devices.

According to an exemplary aspect of the present application, a portable lock may include a plurality of pivotably connected links. In one such embodiment, a plurality of n (e.g., five or more) links are pivotably connected in series, with a first end of the first link member secured to a lock body and a second end of the first link member connected to a first end of the second link, and so on. The second end of the nth link member is releasably secured to the lock body by a locking mechanism disposed in the lock body. The first end of the first link member may likewise be releasably secured to the lock body by a locking mechanism, or alternatively may be permanently secured to the lock body, for example, by a pivotable staked pin or other such connection.

FIGS. 1 and 2 illustrate an exemplary multiple link lock 100 including a lock body 110 and a plurality of links 120 pivotably secured to each other in series at connected pivot features, for example, by aligned pivot holes in the links receiving pivot pins or other such fasteners. A first end link member 120a is permanently and pivotably secured to the lock body 110 at a first end, for example, by a pin 132 secured through a pivot hole 121 (see FIG. 4B) in the first end of the first end link member 120a, aligned with an aperture 112 in the lock body (FIG. 4) to pivotably retain an end portion of the first end link member in a first recess 111 in the lock body 110. A second end link member 120b is lockingly securable to the lock body 110 to form a flexible item retaining loop. A plurality of intermediate link members 120 are connected in series between the first and second end link members 120a, 120b. As shown, each of the link members 120, including the first and second end link members 120a, 120b may, but need not, be substantially identical, for example, for efficient manufacture of the link members.

Figure 4D:
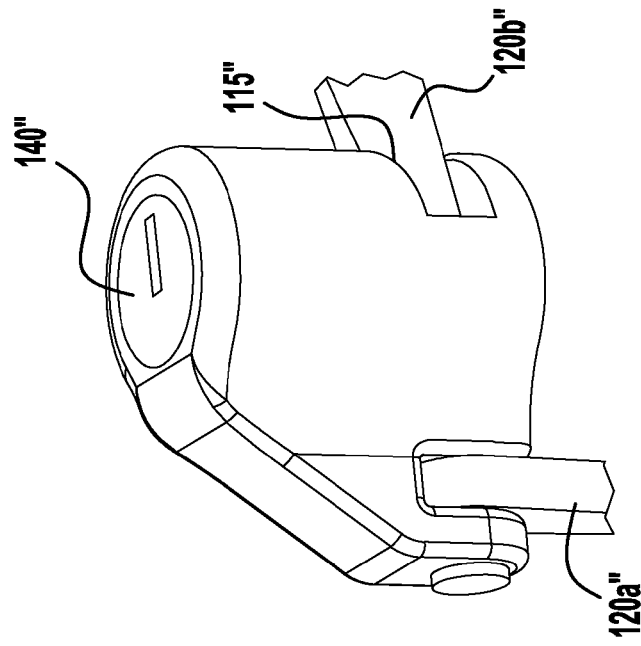
FIG. 4D is a perspective view of the lock body of FIG. 4C, shown with the end link member engaged with the lock body.
Figure 4C:
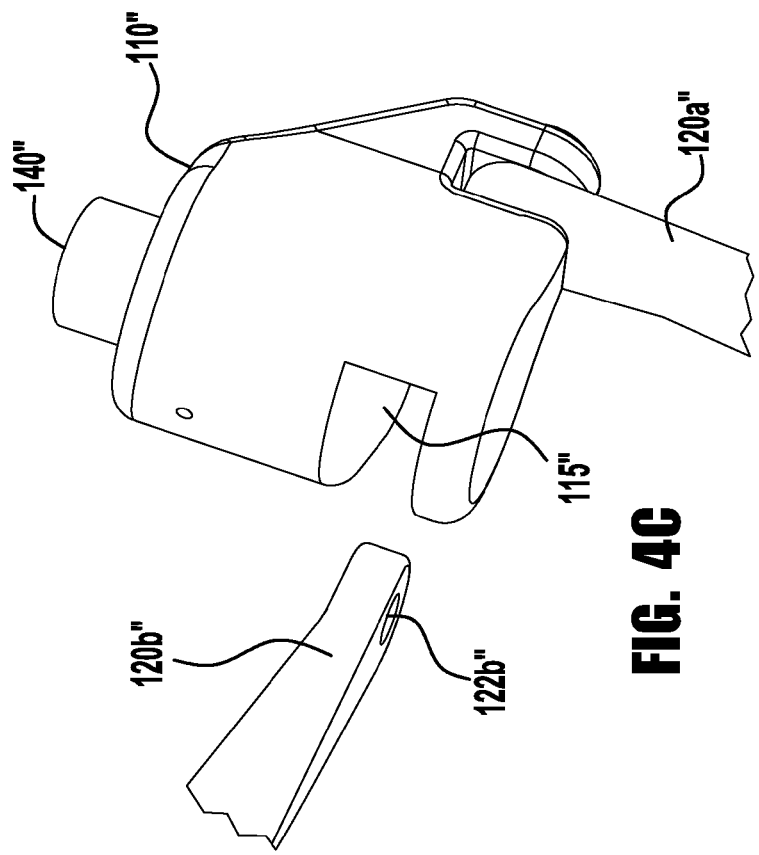
FIG. 4C is a perspective view of another lock body for a multiple link lock assembly, in accordance with an exemplary embodiment, shown with the end link member disengaged from the lock body.

Many different suitable locking mechanisms may be utilized to lockingly secure an end of a link member with a lock body. In the illustrated example (see FIG. 4), the lock body 110 includes a cutout, pocket, or other such recess 115 into which an aperture or pivot hole 121 of a link member 120a is receivable. When the locking mechanism 140 of the lock body is moved to a locking condition, a locking member 118 (e.g., a sliding post) engages the pivot hole to secure the link member with the lock body. In another exemplary embodiment, as shown in FIGS. 4A and 4B, the recess 115' of the lock body 110' may be contoured (e.g., an arcuate surface) to mate with a corresponding contoured surface (e.g., an arcuate outer surface) of the second end link member 120b' to guide the second end link member into a position aligning the pivot hole of the inserted link member with the locking member 118'. In still another exemplary embodiment, as shown in FIGS. 4C and 4D, the recess 115" of the lock body 110" may form a pocket sized to closely receive the second end link member 120b" to properly position the pivot hole in alignment with the locking member.

Many different types of locking mechanisms and locking members may be utilized. In the illustrated embodiment, a key cylinder 140 (e.g., a wafer tumbler key cylinder or a pin tumbler key cylinder) is operable to extend a shackle or post 118 into the lock body recess 115 to lockingly engage the pivot hole 121, and to retract the shackle from the lock body recess to disengage the pivot hole and release the link member. In one such example, the shackle extends from the key cylinder and the key cylinder is axially movable to extend or retract the shackle. The key cylinder may be spring biased toward an extended unlocked position, and user depressible to a locked position, to function as a push-button for locking the lock arrangement. An exemplary key operated "push-button" type lock assembly is described in U.S. Pat. No. 6,904,775, the entire disclosure of which is incorporated herein by reference.

Each link member 120 of the lock assembly 100 is pivotable with respect to the adjacent link members and/or lock body about an axis defined by the pivot hole and the connecting pin 132. While each of the pivot hole axes may be configured to be parallel to each other, in an exemplary embodiment, the series of link members 120 is configured such that at least some of the adjacent pivot hole axes are not parallel to each other. This arrangement allows for pivoting deflection of a link member in a first direction parallel to a pivot hole axis in response to an impact to the link members that is applied in the first direction. This pivoting deflection provides resistance to impact based attacks on the lock assembly. In the illustrated embodiment, the pivot holes 121, 122 at opposite ends of each link member 120 are disposed at an offset angle α with respect to each other about a longitudinal axis X of the link member 120. In the illustrated example, the offset angle α for the pivot holes 121, 122 of each link member is approximately 90° (or substantially perpendicular) to maximize pivoting defection of a second end of a link member when an impact force is applied to the connecting pin of the first end of the link member 120. In other exemplary embodiments, the offset angle α may be between approximately 45° and 135°. In still other embodiments, the offset angle α may be between 30° and 150°. While the link members may be provided in any suitable shape with any suitable number or series of pivotable connections, in one embodiment, the link member shapes and pivot orientations are configured to permit the series of link members to fold into a compact shape, for example, for ease of storage and transportation. As shown, the pivot holes 121, 122 may, but need not, be substantially perpendicular to the longitudinal axis X.

According to another exemplary aspect of the present application, a portable lock may include a rigid bar frame having a lock body hingedly connected with a hinged end of a retainer bar. The retainer bar is pivotable with respect to the lock body to join a free end of the retainer bar with the lock body, to form a closed loop for tethering or otherwise securing an item to an external structure. The lock body includes a locking mechanism (e.g., a key cylinder lock or combination lock mechanism) operable to lockingly engage the free end of the retainer bar to secure the lock assembly in the closed loop condition.

Figure 5:
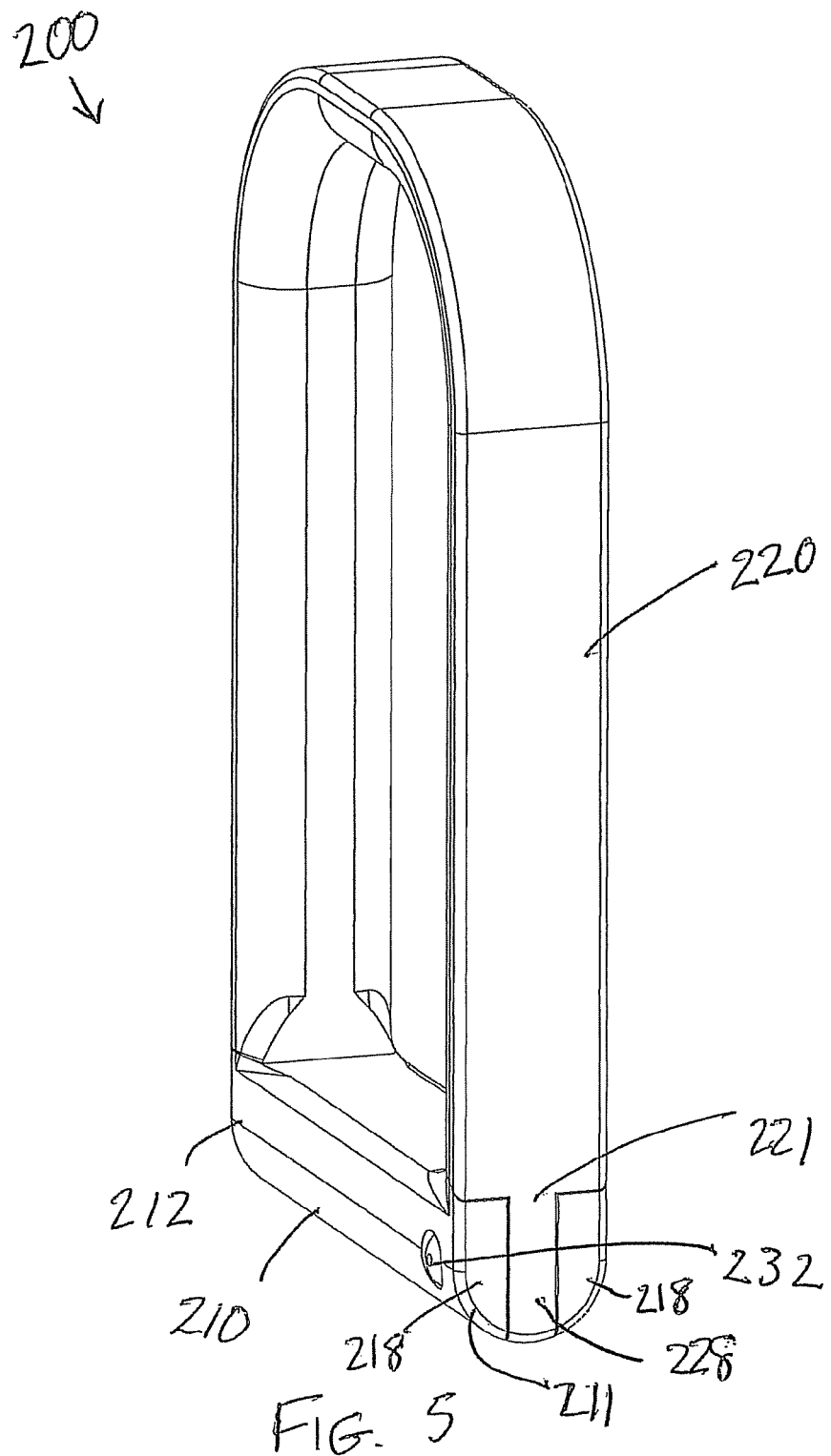
FIG. 5 is a perspective view of a hinged U-bar lock assembly in accordance with an exemplary embodiment, shown in a locked condition.

FIGS. 5-7 illustrate an exemplary hinged U-bar lock 200 including a lock body 210 having a first end 211 hingedly connected with a hinged end 221 of a substantially U-shaped retainer bar 220 (e.g., by a pin 232). The lock body 210 includes a lock aperture 215 at a second end 212 opposite the first end 211. The lock aperture 215 receives a locking post 225 extending from a free end of the retainer bar 220 when the retainer bar 220 is pivoted to a closed loop condition. In this condition, a locking mechanism (e.g., a key cylinder or combination lock mechanism), shown schematically at 240, is operable to secure the retainer bar 220 in the closed loop condition, for example, by lockingly engaging a or other such feature in the locking post 225. While any suitable hinge arrangement may be utilized, in the illustrated embodiment, the retainer bar 220 includes a recessed flange 228 pivotably secured (e.g., by a pin or other fastener) between side flanges 218 extending from the lock body 210. As shown, the flanges 218, 228 may be contoured to provide a smooth, uniform external surface for the hinge portion of the lock 200. While any suitable range of pivoting movement may be provided, in an exemplary embodiment, the lock body 210 is pivotable to an orientation substantially collinear with respect to the retainer bar 220 to facilitate insertion of the lock body 210 and retainer bar 220 through openings in the item (e.g., bicycle frame) and external structure (e.g., bike rack). A layer of rubber, flexible plastic, gel, fabric, or other such soft gripping material may be applied or coupled to at least the inner peripheral surfaces of the lock body 210 and retainer bar 220 to facilitate user handling and minimized damage to the bicycle frame. In embodiments having a soft layer, the layer may be covered by fabric or another material to provide varying aesthetics while maintain the gripping and/or cushioning performance of the soft layer.

FIGS. 8 and 9 illustrate an exemplary hinged L-bar lock 300 including an L-shaped lock body 310 having a first leg 311 hingedly connected with a first leg 321 of a similarly (or substantially identically) shaped retainer bar 320. The lock body 310 includes a lock aperture 315 at an outer end of a second leg extending laterally from the first leg. The lock aperture 315 receives a locking post or other such locking member 325 extending from an outer end 322 of a second leg of the retainer bar 320 when the retainer bar 320 is pivoted to a closed position or closed loop condition. In this condition, a locking mechanism 340 (e.g., a key cylinder or combination lock mechanism) disposed at the outer end of the second leg of the lock body is operable to secure the retainer bar 320 in the closed loop condition, for example, by lockingly engaging a notch or other such feature in the locking post 325. While any suitable hinge arrangement may be utilized, in the illustrated embodiment, a hinge fastener 330 extends from recesses (not shown) in the opposed end faces of the lock body 310 and retainer bar 320 to limit and guide opening movement of the lock body and retainer bar in an unlocked condition. A layer of rubber, flexible plastic, gel, fabric, or other such soft gripping material may be applied or coupled to at least the inner peripheral surfaces of the lock body 310 and retainer bar 320 to facilitate user handling and minimized damage to the bicycle frame. In embodiments having a soft layer, the layer may be covered by fabric or another material to provide varying aesthetics while maintain the gripping and/or cushioning performance of the soft layer.

According to another exemplary aspect of the present application, a portable lock may include a lock body that lockingly retains two or more shackles (e.g., U-bar shackles, flexible shackles). In using such a lock, a first shackle may be locked around a portion of an item to be secured, and a second shackle may be locked around an external structure to which the item is to be tethered, anchored or otherwise secured. In an exemplary embodiment, at least one of the shackles is pivotable about the lock body while in the locked condition, for example, to adjust the angles or positions of the first and second shackles with respect to each other. The shackles may be independently or simultaneously releasable from the lock body (at one or both ends of the shackle) when the locking mechanism is unlocked.

Figure 11:
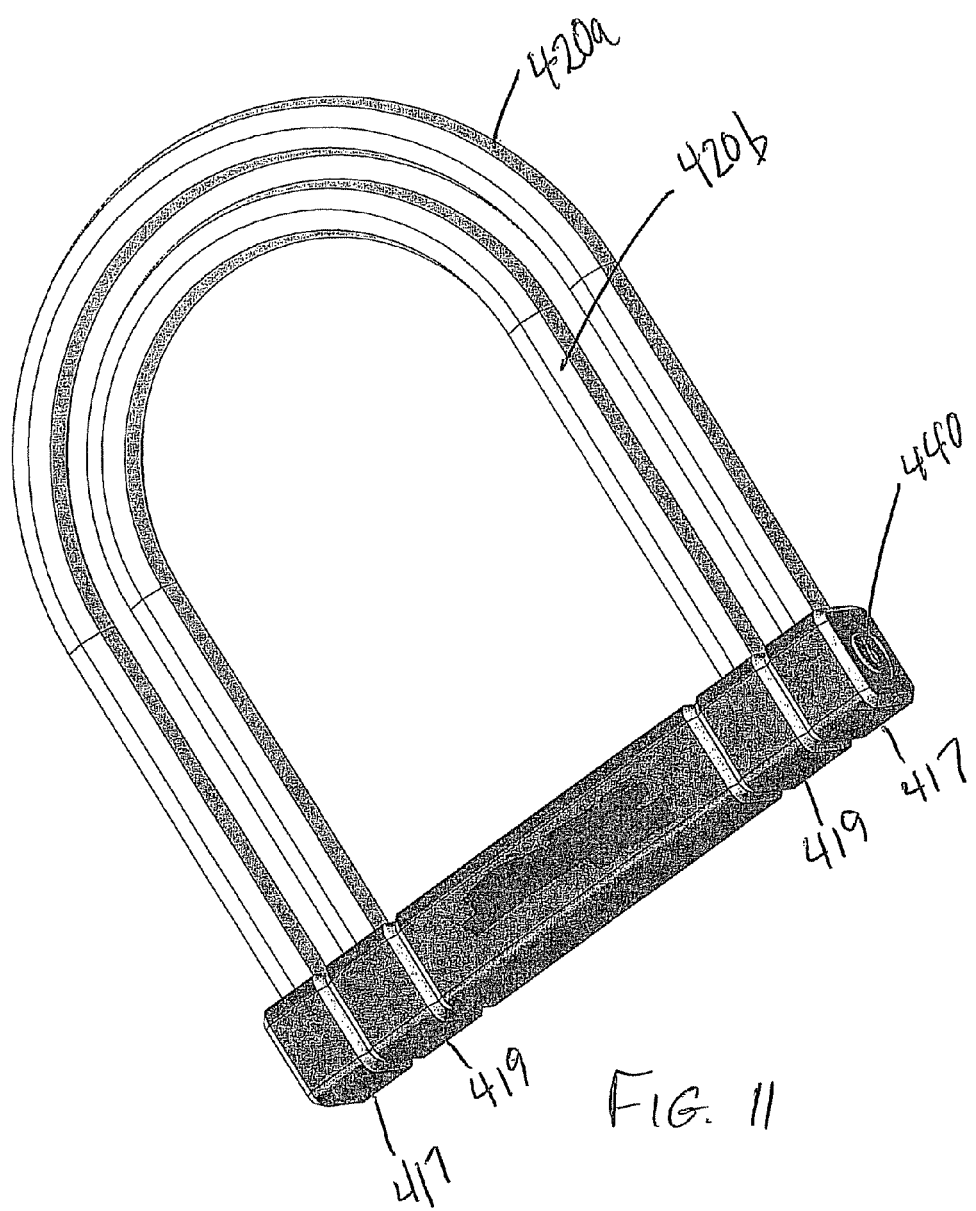
FIG. 11 is a perspective view of the dual shackle lock assembly of FIG. 10, shown in a locked condition with the shackles oriented in aligned positions.
Figure 12B:
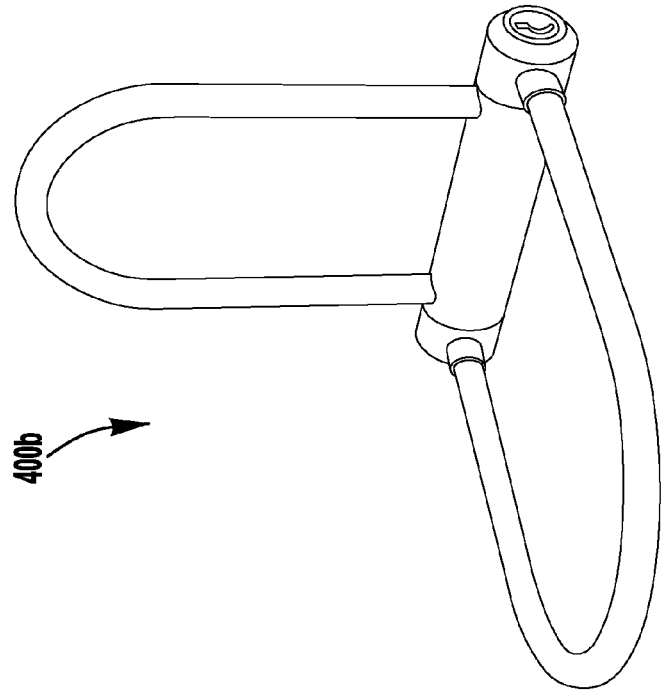
FIG. 12B is a perspective view of a dual shackle lock assembly having a flexible shackle, in accordance with another exemplary embodiment.
Figure 12A:
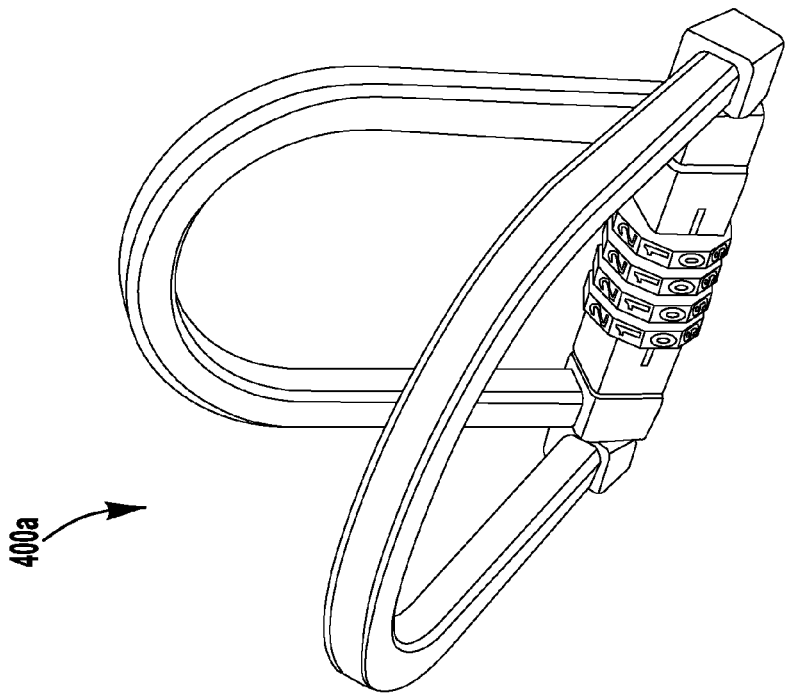
FIG. 12A is a perspective view of a dual shackle lock assembly having a combination locking mechanism, in accordance with another exemplary embodiment.
Figure 13:
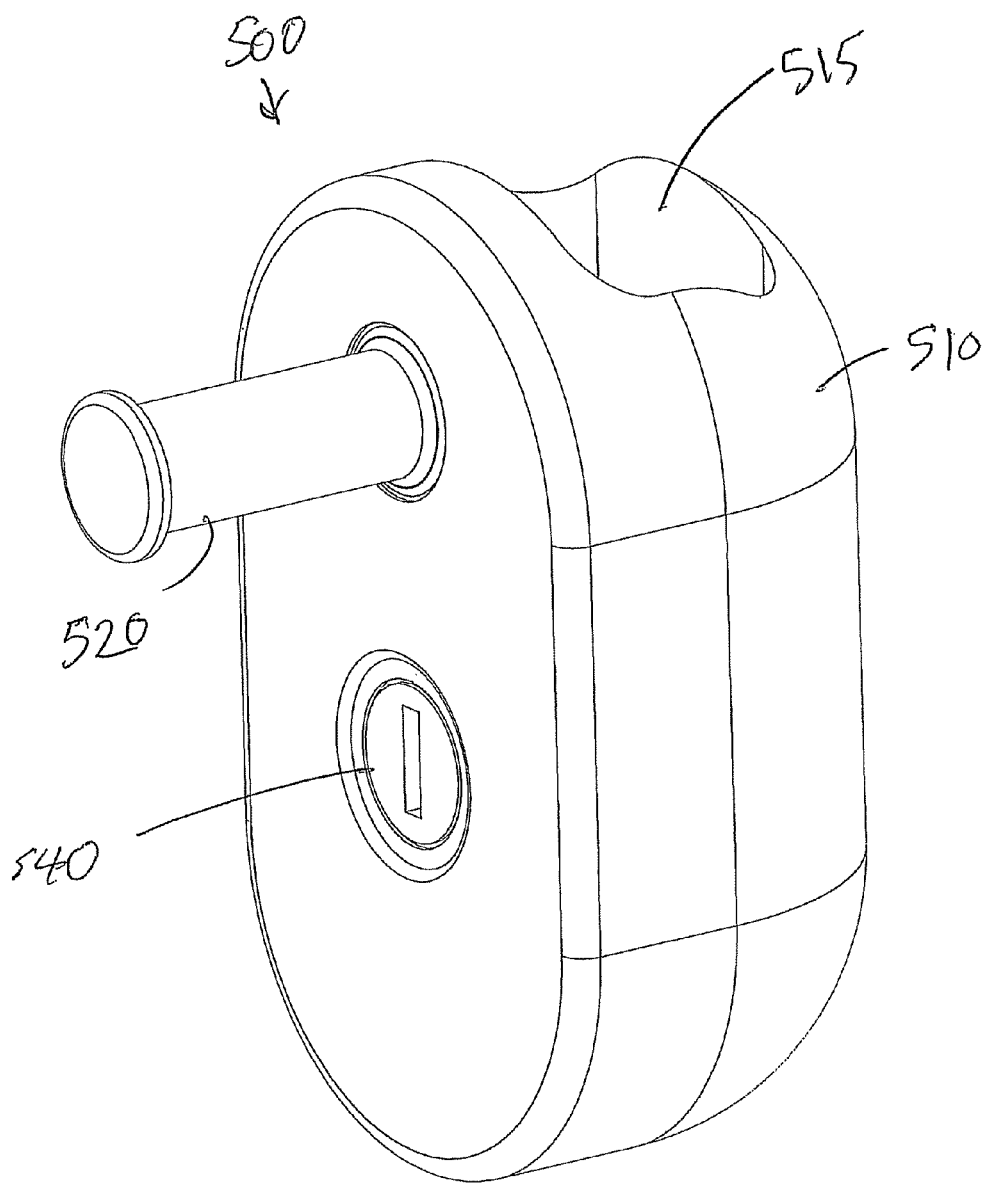
FIG. 13 is an upper side perspective view of a portable lock for securing apertured ends of a flexible locking member, in accordance with an exemplary embodiment, shown in an unlocked condition.
Figure 16:
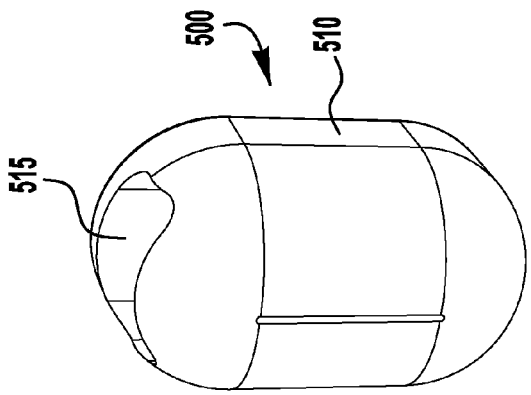
FIG. 16 is an upper rear perspective view of the portable lock of FIG. 13.
Figure 15:
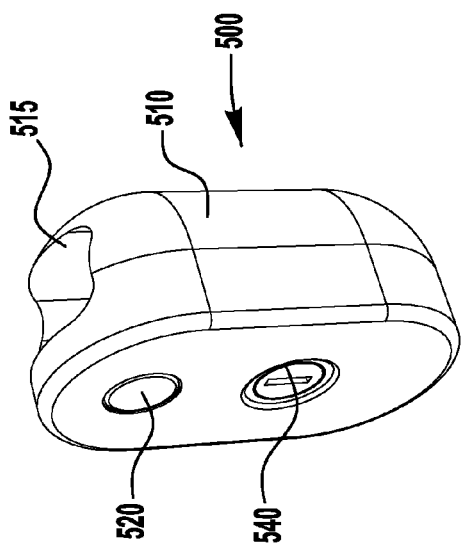
FIG. 15 is an upper side perspective view of the portable lock of FIG. 13, shown in an unlocked position.
Figure 14:
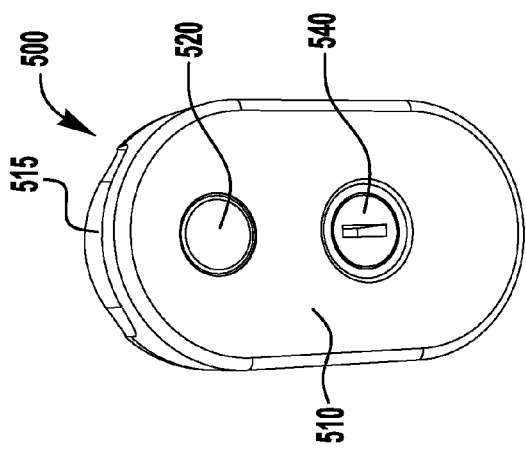
FIG. 14 is a front view of the portable lock of FIG. 13, shown in a locked condition.

FIGS. 10 and 11 illustrate an exemplary dual shackle lock 400 including an elongated lock body 410 and first and second U-shaped shackles 420a, 420b that lockingly engage the lock body 410 when a locking mechanism 440 (e.g., a key cylinder locking arrangement or a combination lock arrangement, see FIG. 12A) is in a locked condition. In the exemplary embodiment, the first shackle 420a is provided with a larger width or distance between end legs for securing with outer sections 417 of the lock body 410, and the second shackle 420b is provided with a smaller width or distance between the end legs for securing with inner sections 419 of the lock body 410. In an exemplary embodiment, the outer sections of the lock body 410 are rotatable with respect to the inner sections 419 of the lock body 410, to allow for adjustment of the angles or positions of the first and second shackles 420a, 420b with respect to each other. In another exemplary embodiment, as shown in FIG. 12B, a dual shackle lock 400b includes at least one flexible shackle.

Any suitable rotational arrangement of the inner and outer lock body sections may be utilized. In one exemplary embodiment, one or both of the shackles may be secured in a selected rotational position by the locking mechanism 440. As one example, the outer and inner lock body sections 417, 419 may be secured to each by the locking mechanism when the locking mechanism is in the locked condition. In another example, the locking mechanism may have multiple selectable conditions (e.g., locked rotatable shackle, locked fixed shackle, and released shackle) to provide for both fixed and rotatable locked shackles. In still other exemplary embodiments, the shackles may be freely rotatable to any orientation. As yet another example, the lock body sections may be provided with detent mechanisms (not shown) that releasably retain the shackles in multiple predetermined orientations (e.g., 90° increments, 45° increments, etc.).

According to still another exemplary aspect of the present application, a portable lock may include a compact lock body that lockingly retains opposite looped or apertured ends of a flexible locking member (e.g., a chain, loop-ended tether) that can be wrapped around the item to be secured and an external structure. In one such exemplary embodiment, the portable lock includes a retaining shackle that is primarily or entirely disposed within a recess in a lock body, thereby blocking access to the shackle, for example, to protect the lock from attacks to the shackle.

FIGS. 13-16 illustrate an exemplary portable lock 500 including lock body 510 defining a recess 515, and a post or shackle 520 that extends through the recess 515 in a locked position to secure opposite looped or apertured ends of a flexible locking member (not shown). The recess 515 is sized to receive the opposite ends of the flexible locking member for retention around the shackle, while limiting destructive access to the post 520. In an exemplary embodiment, the recess 515 may include an internal cavity that is large enough to store the flexible locking member when the lock 500 is not in use. In an unlocked position, the post 520 slides out of the recess 515 and extends outward of the lock body 510 to release the looped or apertured ends of the flexible locking member. While many different types of locking mechanisms may be utilized, in the illustrated example, a key cylinder locking arrangement 540 (e.g., a key cylinder lock arrangement) is laterally spaced apart from the post 520 and is rotatable about an axis substantially parallel to a longitudinal axis of the post 520, to interlock (directly or indirectly) with the post 520 when the shackle is in the locked position. In another exemplary embodiment, a portable lock may utilize a push-button type key cylinder lock from which the shackle extends, as shown and described in the multiple link lock assembly 100 described above and in the above incorporated U.S. Pat. No. 6,904,775.

According to other exemplary aspects of the present application, a portable lock may be mounted to an item to be secured (e.g., a bicycle), for example, to facilitate storage and transportation of the lock. In one exemplary embodiment, a cable lock assembly includes a lock body that is mountable to a bar or frame member of the item to be secured (e.g., a bicycle frame). The cable lock assembly includes a cable locking member having a first end permanently affixed to the lock body and a second end that is lockingly secured to the lock body to form a retaining loop for securing the item to an external structure. FIGS. 17-19 illustrate an exemplary bicycle mountable cable lock 600 including an elongated lock body 610 and a cable 620 permanently affixed to the lock body at a first end and lockingly securable to a lock aperture 615 in the lock body at a second end, by engagement with a locking mechanism, such as, for example, a key cylinder lock arrangement 640 (FIG. 18). The lock body 610 includes a bicycle frame mounting surface 613 (FIGS. 19A, 19B) that is angled with respect to a central axis of the elongated body such that the elongated body 610 of the mounted lock 600 extends at an angle from the bicycle frame member, to allow the unused cable to be wound around the elongated body 610. While any suitable mounting arrangement may be utilized, in the illustrated embodiment, the lock body 610 may be cinched to the bicycle frame, for example, by zip ties 631 (e.g., metal zip ties or zip ties in other cut resistant materials) inserted through slots 616 in the lock body 610 and wrapped around the bicycle frame. A protective cover 635 may additionally be utilized to prevent scratching or other such damage to the bicycle frame. A layer of rubber, flexible plastic, gel, fabric, or other such soft gripping material may be applied or coupled to either of the lock body mounting surface 613 and the cover 635 to facilitate gripping engagement and minimized damage to the bicycle frame. In embodiments having a soft layer, the layer may be covered by fabric or another material to provide varying aesthetics while maintain the gripping and/or cushioning performance of the soft layer.

Figure 20:
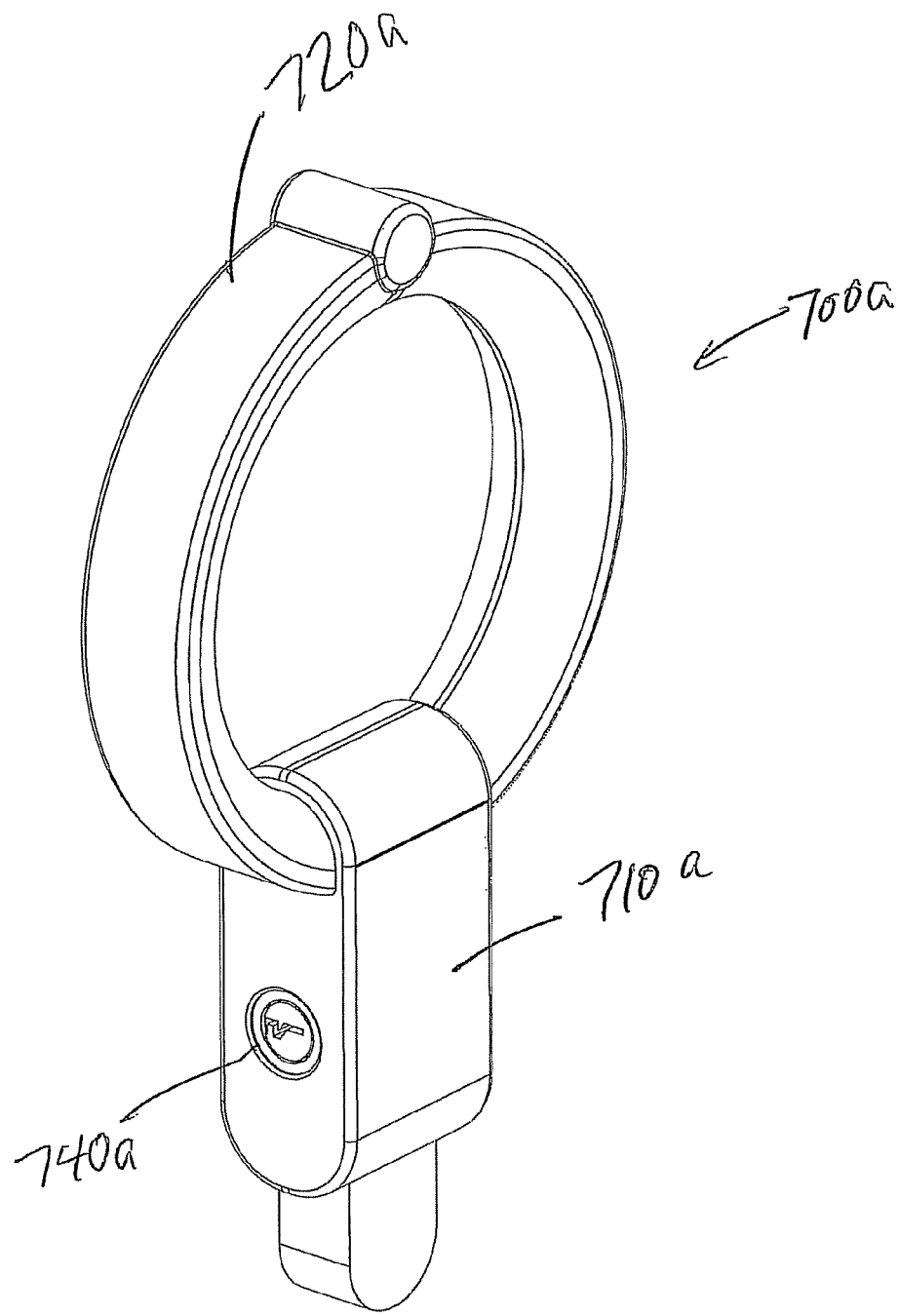
FIG. 20 is a side perspective view of a hinged shackle lock for immobilizing a bicycle wheel, in accordance with an exemplary embodiment, shown in a locked condition.

According to another exemplary aspect of the present application, a portable lock for a bicycle may be configured to lock around a wheel frame of the bicycle and through the spokes of the bicycle wheel to immobilize the bicycle against unauthorized use, preventing a would-be thief from riding away on the bicycle. FIG. 20 illustrates an exemplary cuff-type lock 700a including a lock body 710a and a hinged shackle 720a that is secured by a locking mechanism 740a (e.g., a key cylinder lock arrangement) to form an enclosed loop extending around a bicycle wheel frame and through the wheel spokes to immobilize the bicycle. A similar cuff-type lock is disclosed in the above incorporated U.S. Pat. No. 6,904,775. A layer of rubber, flexible plastic, gel, fabric, or other such soft gripping material may be applied or coupled to at least the inner peripheral surfaces of the lock body 710a and shackle 720a to facilitate user handling and minimized damage to the bicycle frame. In embodiments having a soft layer, the layer may be covered by fabric or another material to provide varying aesthetics while maintain the gripping and/or cushioning performance of the soft layer.

Figure 21A:
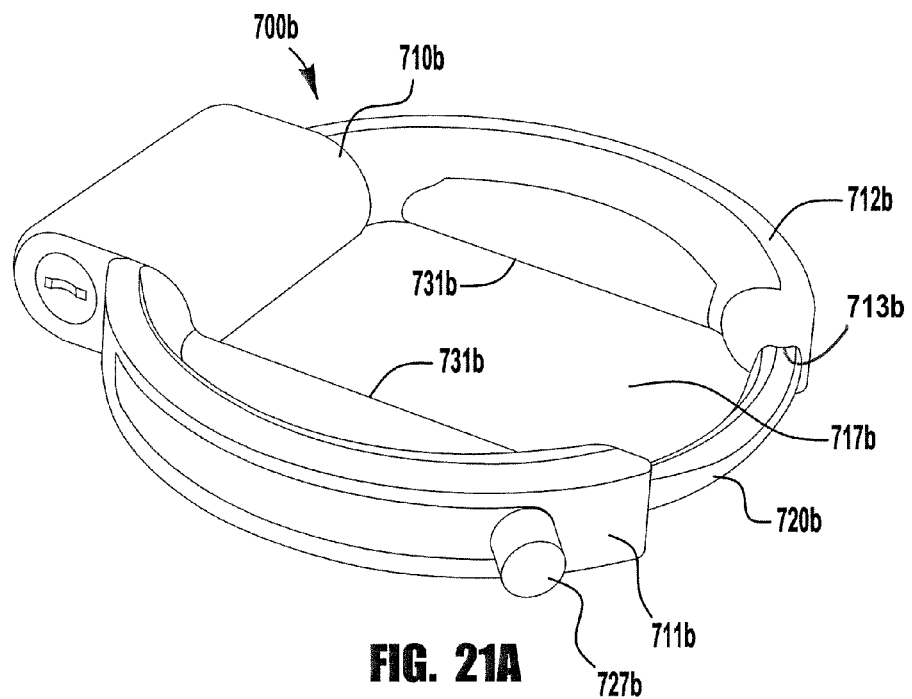
FIG. 21A is a side perspective view of a sliding shackle lock for immobilizing a bicycle wheel, in accordance with an exemplary embodiment.
Figure 22:
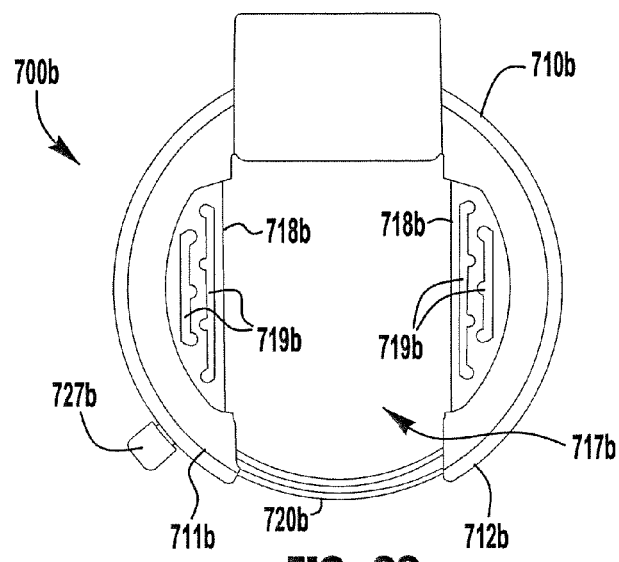
FIG. 22 is a front view of the sliding shackle lock of FIG. 21A, shown with cover portions removed to expose mounting portions of the lock.
Figure 21B:
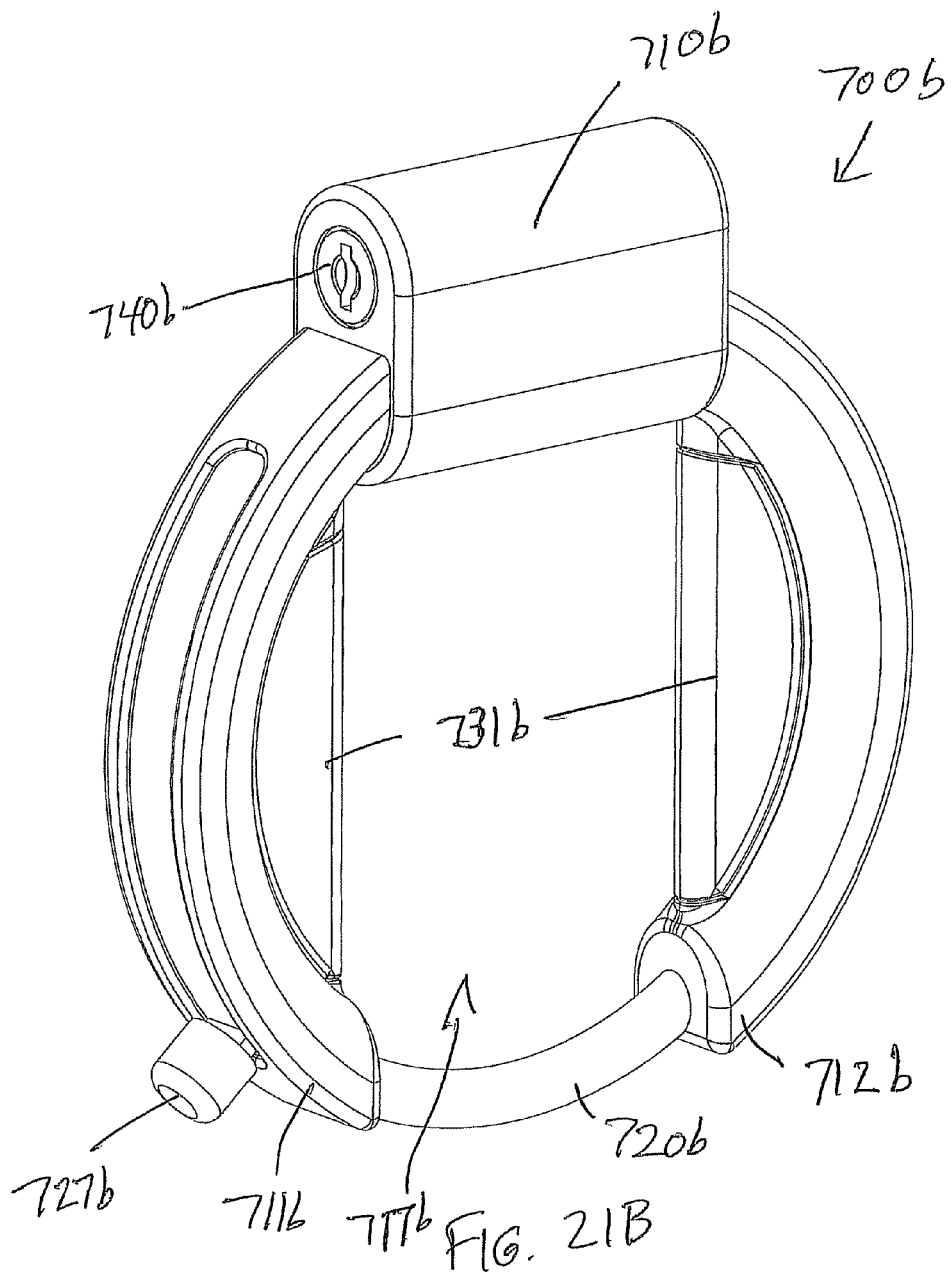
FIG. 21B is a front perspective view of the sliding shackle lock of FIG. 21A.

FIGS. 21A, 21B, and 22 illustrate another exemplary bicycle immobilizing lock 700b, including a lock body 710b defining a central opening 717b for receiving a bicycle wheel frame, and shackle 720b movable to a locking position to form an enclosed loop with the lock body 710b and to extend through the wheel spokes to immobilize the bicycle. While any suitable shackle configuration may be utilized, in the illustrated embodiment, the shackle 720b is a circular shackle that is slidably retractable into a first side portion 711b of the lock body 710b (e.g., by an external knob 727b) to release the bicycle from the external structure, and is extendable from the first side portion into a recess 713b in a second side portion 712b of the lock body 710b to form the enclosed loop. While any suitable locking arrangement may be utilized to secure the shackle 720b in the locking position, in the illustrated embodiment, a key cylinder locking arrangement 740b is disposed in the lock body 710b and configured to block movement of the shackle 720b when in a locked condition. As shown, the exemplary lock body 710b includes side mounting portions 718b with slots 719b for receiving zip ties or other mounting fasteners for securing the lock body 710b to a bicycle frame, such that the lock 700b is permanently mounted around the wheel frame, and the shackle 720b is selectively extended through the wheel spokes and locked to disable the bicycle. Additionally or alternatively, the lock 700b may remain detached from the bicycle frame when secured around the bicycle wheel frame. As shown, the lock 700b may be provided with soft removable cover portions 731b that fit over the mounting portions 718b, for example, to protect the bicycle from damage or to facilitate user handling. A layer of rubber, flexible plastic, gel, fabric, or other such soft gripping material may also be applied or coupled to at least the inner peripheral surfaces of the lock body 710b to facilitate user handling and minimized damage to the bicycle frame. In embodiments having a soft layer, the layer may be covered by fabric or another material to provide varying aesthetics while maintain the gripping and/or cushioning performance of the soft layer.

In other embodiments (not shown) a second locking member (e.g., a cable, chain or shackle) either integral to or separate from the lock, may be used to secure the lock body 710a, 710b to an external structure, such that the bicycle is both immobilized and secured to the location of the external structure.

Figure 23:
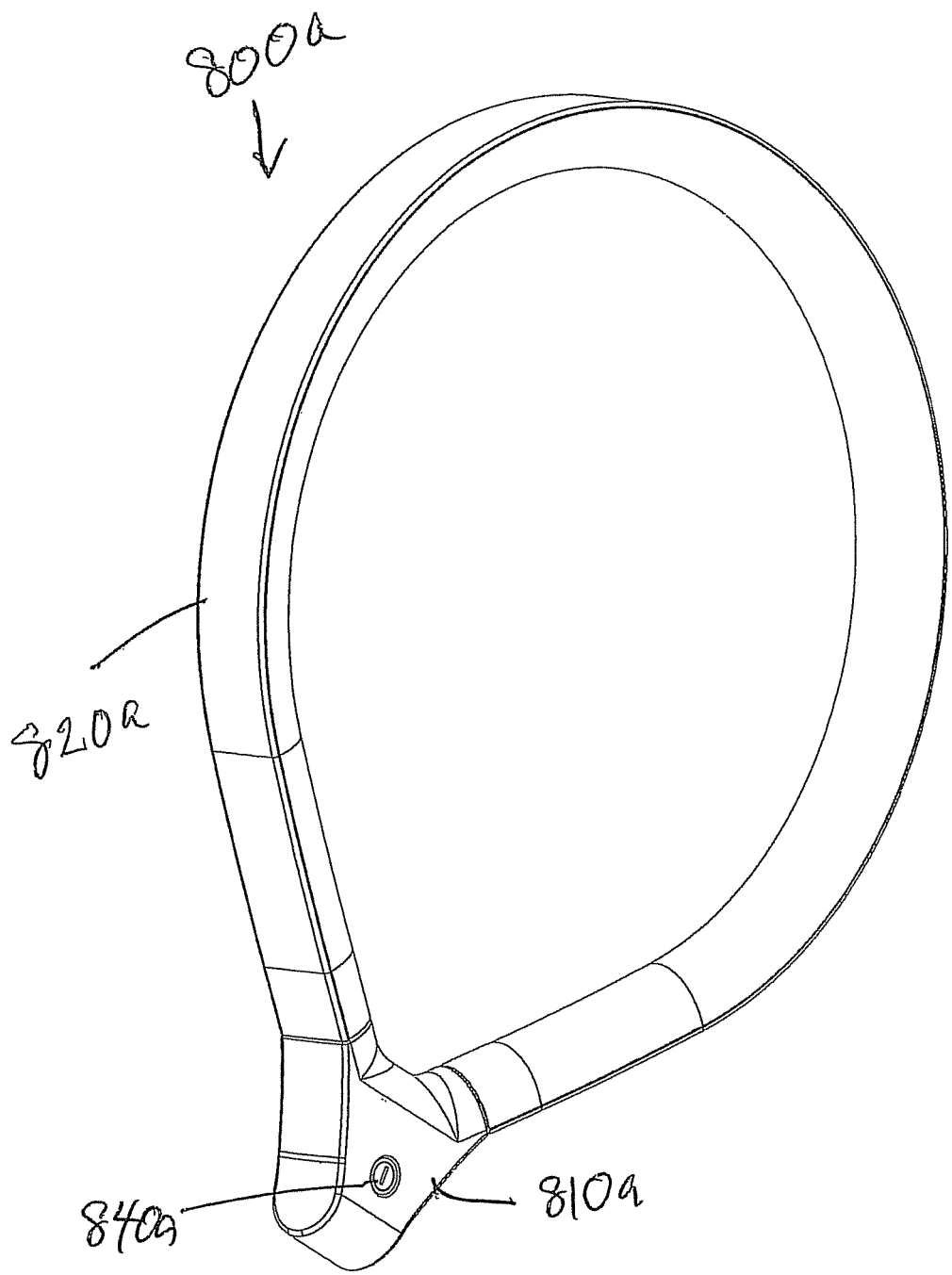
FIG. 23 is a front perspective view of a sheathed cable lock, in accordance with an exemplary embodiment.
Figure 24:
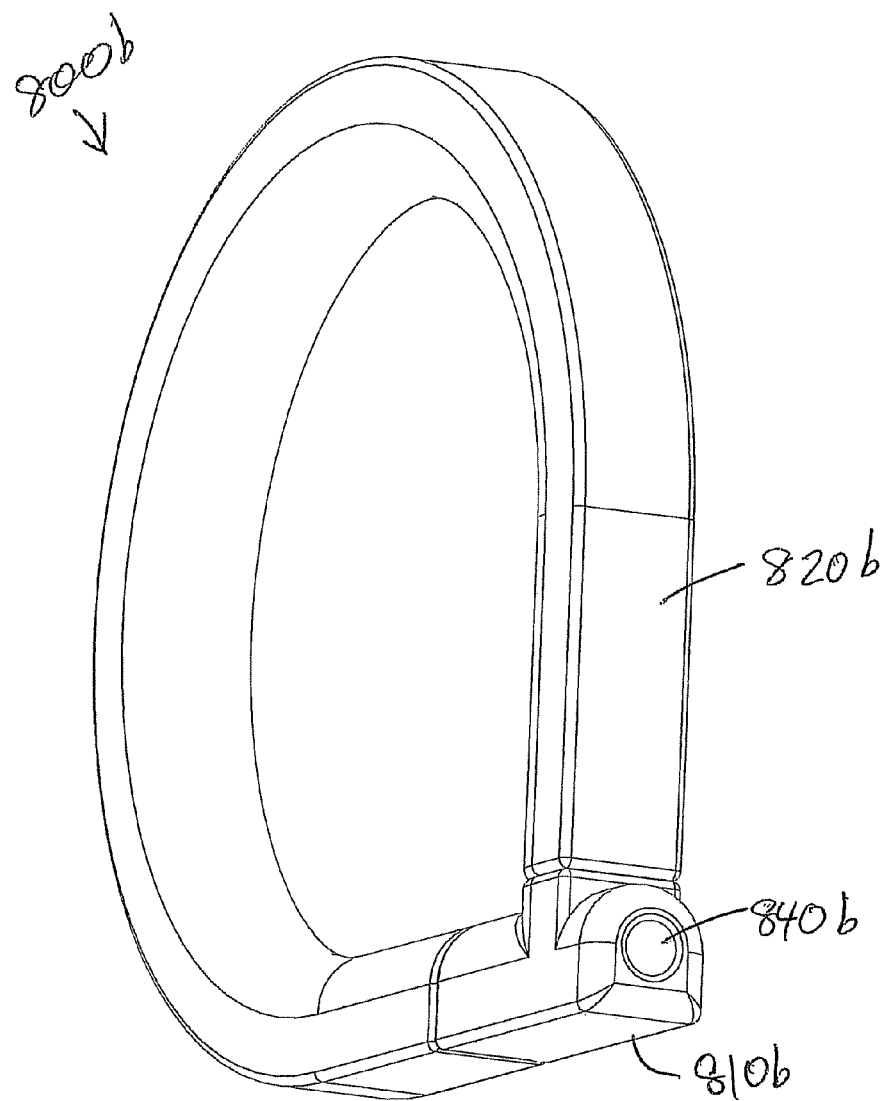
FIG. 24 is a side perspective view of a sheathed chain lock, in accordance with an exemplary embodiment.
Figure 25:
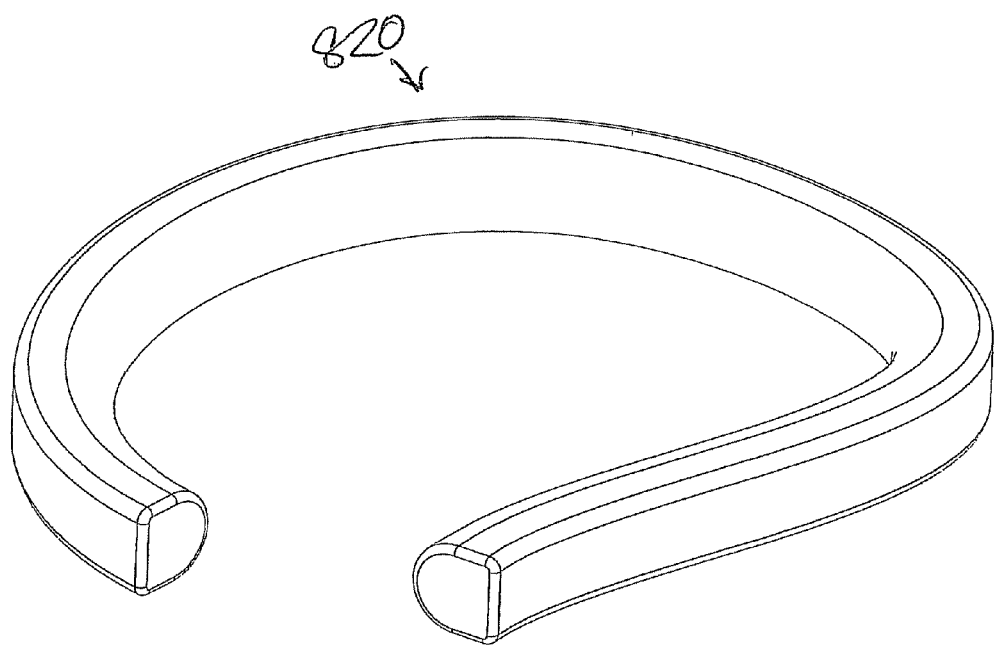
FIG. 25 is a side perspective view of a sheath for a flexible locking member, in accordance with an exemplary embodiment.

Still other embodiments include cable or chain locking arrangements that wrap around a portion of an item (e.g., a bicycle) and a portion of an external structure (e.g., a bike rack) to secure the item to the external structure. FIGS. 23 and 24 illustrate portable locks 800a, 800b having a lock body 810a, 810b that lockingly engages one or both ends of a cable or chain locking member (not shown) surrounded by a protective sleeve or sheath 820a, 820b (e.g., in a soft material, such as a fabric or rubber material, see FIG. 25), for example, to protect the bicycle from damage or to facilitate user handling. In one example, the lock body 810a may include a key cylinder lock arrangement 840a configured to lockingly engage an end post, shackle, or other fastener (not shown) fixed to one or both ends of a cable locking member (not shown). As another example, the lock body 810b may include a key cylinder lock arrangement 840b configured to extend a shackle or retaining pin through an inserted end loop or chain link of a cable or chain locking member, similar to the locking mechanism of the multiple link lock 100 of FIGS. 1-4, and the locking mechanism described in the above incorporated U.S. Pat. No. 6,904,775. A layer of rubber, flexible plastic, gel, fabric, or other such soft gripping material may also be applied or coupled to at least the inner peripheral surfaces of the lock body 810a, 810b to facilitate user handling and minimized damage to the bicycle frame. In embodiments having a soft layer, the layer may be covered by fabric or another material to provide varying aesthetics while maintain the gripping and/or cushioning performance of the soft layer.

Other embodiments may include different types of flexible locking members configured to be wrapped around a portion of an item (e.g., a bicycle) and a portion of an external structure (e.g., a bike rack) to secure the item to the external structure. FIGS. 26-28 illustrate beaded cable locks 900a, 900b including a lock body 910a, 910b with a locking mechanism (e.g., key cylinder lock arrangement 940a, as shown in FIGS. 26 and 27, or combination locking arrangement 940b, as shown in FIG. 28) that lockingly engages a fastener end 922a (e.g., a post, loop, or shackle) on a first end of a cable 920a, 920b when the fastener end is inserted in a lock aperture 915a (FIG. 27) in the lock body. The second end of the cable 920a, 920b may be permanently affixed to the lock body 910a, 910b, or may alternatively be lockingly engageable with the lock mechanism 940a, 940b when a fastener end on the second end of the cable is inserted in a second lock aperture in the lock body. In addition to the aesthetic appeal of the beaded cable lock assembly, the beads 925a, 925b may additionally provide increased strength and cut resistance to the cable 920. While the beads 925a, 925b may be provided in any suitable size and shape (including variable sizes and shapes), in an exemplary embodiment, the beads 925a, 925b are no larger than 4.5 cm in diameter to facilitate insertion through the spokes in a bicycle wheel.

FIG. 29 illustrates a zip-tie lock assembly 1000 having a lock body 1010 secured to a first end 1021 of a zip-tie locking member 1020. The lock body 1010 includes a slot 1015 for receiving a second end 1022 of the zip-tie locking member 1020 therethrough, and a locking mechanism (for example, a key cylinder locking mechanism 1040) that lockingly engages one or more teeth 1023 of the zip-tie locking member 1020 disposed within the slot 1015 to prevent withdrawal of the zip-tie locking member 1020 from the slot. In one exemplary embodiment, the locking mechanism is configured to be operable to a first locking condition in which the zip-tie locking member is movable within the lock body slot 1015 in a tightening or cinching direction but secured against movement in a loosening or releasing direction. In another exemplary embodiment, the locking mechanism is additionally or alternatively configured to be operable to a second locking condition in which the zip-tie locking member is secured against movement in both tightening and loosening directions.

While various aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

I claim:

1. A lock assembly comprising:
   at least first, second, and third link members each extending along a longitudinal axis between a first end having a first pivot feature defining a first pivot axis and a second end having a second pivot feature defining a second pivot axis, wherein the longitudinal axis, the first pivot axis, and the second pivot axis are substantially perpendicular to each other, and
   a lock body pivotably connected to the first pivot feature of the first link member and including a locking mechanism and a locking member configured to lockingly engage the second pivot feature of the second link member when the locking mechanism is moved to a locked condition;
   wherein when the second pivot feature of the second link member is lockingly engaged with the locking member of the lock body, the second pivot axis of the second link member is substantially perpendicular to the first pivot axis of the first link member.

2. The lock assembly of claim 1, wherein the first and second pivot features of each of the first, second, and third link members comprise first and second pivot holes.

3. The lock assembly of claim 1, wherein the lock body comprises a recess sized to receive the second end of the second link member.

4. The lock assembly of claim 3, wherein the recess includes an arcuate internal surface contoured to mate with an arcuate end surface of the second end of the second link member to align the second pivot feature of the second link member with the locking member.

5. The lock assembly of claim 3, wherein the locking member comprises a post extendable to engage the second pivot feature of the second link member when the second end of the second link member is received in the lock body recess and the locking mechanism is in the locked condition.

6. The lock assembly of claim 5, wherein the locking mechanism comprises a key cylinder slideable in an axial direction within the lock body to move the post between aperture engaging and aperture disengaging positions.

7. The lock assembly of claim 1, wherein each of the first, second, and third link members is substantially identical.

8. The lock assembly of claim 1, wherein the first pivot feature of the third link member is pivotably connected to the second pivot feature of the first link member, such that the first pivot axis of the third link member is collinear with the second pivot axis of the first link member.

9. A lock assembly comprising:
   a plurality of link members each extending along a longitudinal axis between first and second ends of the link member, each of the plurality of link members being pivotably connected to an adjacent one of the plurality of link members, the plurality of link members including a first end link member and a second end link member, the second end of the second end link member including a locking feature;
   a lock body pivotably secured to the first end of the first end link member, the first end link member being pivotable about a first lock axis, the lock body including a locking mechanism and a locking member configured to lockingly engage the locking feature of the second end link member when the locking mechanism is moved to a locked condition, such that the second end link member is pivotable about a second lock axis that is substantially perpendicular to the first lock axis;
   wherein each of the plurality of link members connected between the first and second end link members is pivotable about a first pivot axis with respect to an adjacent link member connected to the first end and pivotable about a second pivot axis with respect to another adjacent link member connected to the second end, wherein the longitudinal axis, the first pivot axis, and the second pivot axis are substantially perpendicular to each other.

10. The lock assembly of claim 9, wherein the lock body comprises a recess sized to receive the second end of the second end link member.

11. The lock assembly of claim 10, wherein the locking feature comprises a pivot hole in the second end of the second end link member.

12. The lock assembly of claim 11, wherein the locking member comprises a post extendable through the pivot hole in the second end link member when the second end of the second end link member is received in a recess in the lock body and the locking mechanism is moved to the locked condition.

13. The lock assembly of claim 12, wherein the locking mechanism comprises a key cylinder slideable in an axial direction within the lock body to move the post between hole engaging and hole disengaging positions.

14. The lock assembly of claim 12, wherein the second end link member is pivotable about the post when the post is extended through the pivot hole of the second end link member.

15. The lock assembly of claim 9, wherein each of the plurality of link members is substantially identical.

16. The lock assembly of claim 9, wherein the first pivot axis of each of the plurality of link members connected between the first and second end link members is collinear with respect to the second pivot axis of the adjacent link member.

* * * * *